(12) United States Patent
Yamasaki et al.

(10) Patent No.: US 9,697,049 B2
(45) Date of Patent: Jul. 4, 2017

(54) JOB SCHEDULING APPARATUS AND METHOD BASED ON ISLAND EXECUTION TIME

(71) Applicant: HITACHI, LTD., Tokyo (JP)

(72) Inventors: Kenta Yamasaki, Tokyo (JP); Daisuke Iizuka, Tokyo (JP); Yutaka Kudo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/890,217

(22) PCT Filed: Mar. 27, 2014

(86) PCT No.: PCT/JP2014/058822
§ 371 (c)(1),
(2) Date: Nov. 10, 2015

(87) PCT Pub. No.: WO2015/145652
PCT Pub. Date: Oct. 1, 2015

(65) Prior Publication Data
US 2016/0085590 A1   Mar. 24, 2016

(51) Int. Cl.
*G06F 9/50* (2006.01)
*G06F 9/48* (2006.01)
(Continued)

(52) U.S. Cl.
CPC ............. *G06F 9/5027* (2013.01); *G06F 9/48* (2013.01); *G06F 11/32* (2013.01); *G06F 11/34* (2013.01);
(Continued)

(58) Field of Classification Search
CPC .................................................... G06F 9/5027
See application file for complete search history.

(56) References Cited

U.S. PATENT DOCUMENTS

| 6,112,023 | A | * | 8/2000 | Dave | ..................... G06F 9/4887 703/27 |
| 2005/0015767 | A1 | * | 1/2005 | Nash | ..................... G06F 9/4887 718/102 |

(Continued)

FOREIGN PATENT DOCUMENTS

JP   2009-181494 A   8/2009

*Primary Examiner* — Charlie Sun
(74) *Attorney, Agent, or Firm* — Volpe and Koenig, P.C.

(57) ABSTRACT

A management apparatus comprises a processor configured to execute a program and a storage resource configured to store the program, wherein the processor executes: an identifying process configured to identify an another job having a scheduled execution period overlapping with a scheduled execution period of an estimation subject job among a plurality of jobs executed at a first server from the plurality of jobs; a calculating process configured to calculate an islanding execution time in which the estimation subject job is executed individually at the first server based on the scheduled execution period of the estimation subject job and the scheduled execution period of the another job identified in the identifying process and a creation process configured to create a schedule which correlates the estimation subject job with the islanding execution time calculated in the calculating process.

6 Claims, 24 Drawing Sheets

(51) Int. Cl.
 *G06F 11/32* (2006.01)
 *G06F 11/34* (2006.01)

(52) U.S. Cl.
 CPC ........ *G06F 11/323* (2013.01); *G06F 11/3409* (2013.01)

(56) References Cited

U.S. PATENT DOCUMENTS

2008/0184241 A1* 7/2008 Headrick .............. G06F 9/4843
 718/102
2013/0185433 A1* 7/2013 Zhu ....................... H04L 67/303
 709/226

* cited by examiner

JOB NET DEFINITION INFORMATION

EXECUTION AGENT GROUP INFORMATION

| EXECUTION AGENT GROUP (501) | EXECUTION AGENT (502) |
|---|---|
| AgtGrp1 | Agent10 |
|  | Agent20 |
| ... | ... |

141

JOB DEFINITION INFORMATION

| JOB NAME (601) | EXECUTION AGENT (602) |
|---|---|
| Job1 | AgtGrp1 |
| Job2 | Agent2 |
| Job3 | AgtGrp2 |
| ... | ... |

142

EXECUTION AGENT DEFINITION INFORMATION

| EXECUTION AGENT | EXECUTION SERVER |
|---|---|
| Agent1 | SV1 |
| Agent2 | SV2 |
| ... | ... |
| Agent10 | SV10 |
| Agent20 | SV20 |
| ... | ... |

Fig. 7

JOB NET SCHEDULE INFORMATION 144

| JOB NET NAME 801 | SCHEDULED START TIME 802 | SCHEDULED END TIME 803 | SCHEDULED EXECUTION PERIOD 804 | END DATE 805 | EXECUTION TIMING 806 |
|---|---|---|---|---|---|
| JobNet1 | 01:00 | 03:00 | 2H | 03:30 | EVERYDAY |
| ... | ... | ... | ... | ... | ... |

Fig. 8

JOB SCHEDULE INFORMATION 145

| JOB NAME 901 | SCHEDULED START TIME 902 | SCHEDULED END TIME 903 |
|---|---|---|
| Job1 | 01:00 | 01:30 |
| Job2 | 01:35 | 02:15 |
| ... | ... | ... |

Fig. 9

JOB NET RESULT INFORMATION 146

| JOB NET NAME | RESULT START DATE AND TIME | RESULT END DATE AND TIME |
|---|---|---|
| JobNet1 | 2014/01/27 01:00 | 2014/01/27 03:00 |
| | 2014/01/26 01:00 | 2014/01/26 02:58 |
| | 2014/01/25 00:58 | 2014/01/25 03:00 |
| | ... | ... |
| JobNet2 | 2014/01/27 02:30 | 2014/01/27 03:45 |
| ... | ... | ... |

Fig. 10

JOB RESULT INFORMATION 147

| JOB NAME | RESULT START DATE AND TIME | RESULT END DATE AND TIME |
|---|---|---|
| Job1 | 2014/01/27 01:00 | 2014/01/27 01:30 |
| | 2014/01/26 01:00 | 2014/01/26 01:28 |
| | 2014/01/25 00:58 | 2014/01/25 01:30 |
| | ... | ... |
| Job2 | 2014/01/27 01:35 | 2014/01/27 02:15 |
| ... | ... | ... |

Fig. 11

EVALUATION STANDARD DEFINITION INFORMATION 148

| EVALUATION ITEM | EVALUATION STANDARD DEFINITION |
|---|---|
| MINIMUM ISLANDING EXECUTION TIME | 10 MINUTES |
| MINIMUM DELAY TIME | 15 MINUTES |
| OVERLAP VOLUME | EQUAL TO OR MORE THAN 80% |
| LOG EVALUATION STANDARD | • ○○/min<br>• NEAR CENTRAL TIME |
| LOG TIME SERIES STANDARD | • ORDER FOR DATA PROCESS BY EXECUTION SERVER IMMEDIATELY AFTER DATA ACQUISITION FROM DB<br>• ORDER FOR DATA STORAGE BY EXECUTION SERVER IMMEDIATELY BEFORE DATA STORAGE AT DB |
| EVALUATION OF DIFFERENCE | • EQUAL TO OR MORE THAN 30% |
| EVALUATION OF ADJUSTMENT | EVENLY／ARRANGEMENT ONLY／DELAY ONLY |

Fig. 12

JOB ARRANGEMENT CANDIDATE INFORMATION 149

| ESTIMATION SUBJECT JOB NAME | EXECUTION SERVER | ISLANDING EXECUTION PERIOD | COEXISTING JOB NAME | TRANSFER JOB INFORMATION |
|---|---|---|---|---|
| Job1 | SV10 | 01:00-01:20 | Job2<br>Job3 | Job4→SV4<br>Job5→SV2 |
|  | SV20 | 01:05-01:15 | Job6 |  |

Fig. 13

CONFIGURATION ESTIMATION PROCESS SCHEDULE 150

| ESTIMATION SUBJECT JOB NAME | OPERATION JOB NAME | EXECUTION SERVER | SCHEDULED START TIME | SCHEDULED END TIME | ESTIMATION PROCESS PERIOD | CONFIGURATION ESTIMATION METHOD | STATUS INFORMATION |
|---|---|---|---|---|---|---|---|
| Job1 | Job1 | SV10 | 01:00 | 01:30 | 01:00-01:20 | ARRANGEMENT ADJUSTMENT | 2014/01/28 EXECUTION REGISTRATION |
| | Job2 | SV4 | — | — | — | ARRANGEMENT ADJUSTMENT | |
| | Job5 | SV2 | — | — | — | ARRANGEMENT ADJUSTMENT | |
| Job1 | Job1 | SV10 | 01:10 | 01:40 | 01:10-01:30 | ARRANGEMENT ADJUSTMENT | 2014/01/29 EXECUTION REGISTRATION |
| | Job2 | SV4 | — | — | — | ARRANGEMENT ADJUSTMENT | |
| | Job5 | SV2 | — | — | — | ARRANGEMENT ADJUSTMENT | |
| ... | ... | ... | ... | ... | ... | ... | ... |
| Job1 | Job1 | SV10 | 01:10 | 01:40 | 01:00-01:40 | DELAY ADJUSTMENT | 2014/01/30 EXECUTION REGISTRATION |
| Job1 | Job1 | SV10 | 01:20 | 01:50 | 01:00-01:50 | DELAY ADJUSTMENT | |
| ... | ... | ... | ... | ... | ... | ... | ... |

Fig. 14

LOG ACQUISITION MEANS INFORMATION

151

| SERVER NAME | SOFTWARE | LOG PASS | ACQUISITION MEANS |
|---|---|---|---|
| DB1 | ○○○ | c:¥XXX.log | API_URL |
| Web1 | ○○○ | /var/log/xxx.log | API_URL |
| ... | | | |

CONFIGURATION ESTIMATION INFORMATION

152

| ESTIMATION SUBJECT JOB NAME | BACK END SERVER | EVALUATION VALUE |
|---|---|---|
| Job1 | DB1 | ... |
| | DB2 | ... |
| | DB5 | ... |
| Job2 | DB2 | ... |
| ... | ... | ... |

| ACQUISITION DATE AND TIME | CPU USE RATE [%] | MEMORY USE RATE [%] | DISK I/O USE RATE [%] | NETWORK I/O USE RATE [%] |
|---|---|---|---|---|
| 2014/01/26 01:00 | 30 | 50 | 30 | 20 |
| ... | ... | ... | ... | ... |

RESOURCE PERFORMANCE MANAGEMENT INFORMATION 153

1701  1702  1703  1704  1705

ESTIMATION SUBJECT JOB MANAGEMENT
INFORMATION

154

| JOB NAME | EXECUTION STATUS | EXECUTION DATE |
|---|---|---|
| Job1 | ALREADY EXECUTED | 2014/02/12 |
| Job2 | NOT YET EXECUTED | — |
| ... | ... | ... |

JOB SCHEDULING APPARATUS AND METHOD BASED ON ISLAND EXECUTION TIME

BACKGROUND

The present invention is related to a management apparatus and a management method for managing a job.

A management system for batch jobs such as data back up and processes for calculating various types of values is widely used to process data in units such as daily or monthly in a routine process. The batch job management system, which includes an execution agent that is configured to manage the execution timings of each batch job (hereinafter, simply referred to as "job") and the contents of the execution, and process a request for executing a job, manages information which an operation server of the execution agent processed. The execution agent which has received a job execution request calls a program necessary for processing the job at the operation server, and the called program communicates with a database server or file server of the back end (back end server group) for the information necessary for processing the job. By this, the job will be processed. As a method to specify the contents of the job execution Japanese Unexamined Patent Application Publication No. 2009-181494 (JP 2009-181494 A) has been available. JP 2009-181494 A discloses a job process system for identifying the job process contents by reading the difference of the log information indicating the process contents of at least 2 times within a predetermined period including a job processing period.

However, the scope the batch job management system manages extends to the programs called by the execution agent, while the batch job management system is unable to identify the job execution configuration which indicates with which back end server group the program exchanges information. In other words, when the relationship between the server where the execution agent operates and the back end server group is identified by the analysis of the access log information, the access is recorded at the access log by units of individual servers. Accordingly, while it is possible to determine from the difference in the log information such as in JP 2009-181494 A which server made an access to the back end server, it is not possible to determine the job execution configuration indicating which job at the server accessed the back end server.

SUMMARY

The present invention is intended for a purpose of improving the accuracy in identifying a job execution configuration.

A management apparatus a management method comprise a processor configured to execute a program and a storage resource configured to store the program, wherein the processor executes: an identifying process configured to identify an another job having a scheduled execution period overlapping with a scheduled execution period of an estimation subject job among a plurality of jobs executed at a first server from the plurality of jobs; a calculating process configured to calculate an islanding execution time in which the estimation subject job is executed individually at the first server based on the scheduled execution period of the estimation subject job and the scheduled execution period of the another job identified in the identifying process and a creation process configured to create a schedule which correlates the estimation subject job with the islanding execution time calculated in the calculating process.

According to a typical embodiment of the present invention, it becomes possible to improve the accuracy in identifying an execution configuration of a job. Other objects, configurations, and effects than those described above are clarified by the following description of an embodiment.

BRIEF DESCRIPTION OF THE DRAWINGS

FIG. 7 is an explanatory diagram illustrating an example of the memory contents of an execution agent definition information.

FIG. 8 is an explanatory diagram illustrating an example of the memory contents of job net schedule information.

FIG. 9 is an explanatory diagram illustrating an example of the memory contents of job schedule information.

FIG. 10 is an explanatory diagram illustrating an example of the memory contents of the job net result information.

FIG. 11 is an explanatory diagram illustrating an example of the memory contents of the job result information.

FIG. 12 is an explanatory diagram illustrating an example of the memory contents of an evaluation standard definition information.

FIG. 13 is an explanatory diagram illustrating an example of the memory contents of the job arrangement candidate information.

FIG. 14 is an explanatory diagram illustrating an example of the memory contents of the analysis subject schedule.

FIG. 15 is an explanatory diagram illustrating an example of the memory contents of log acquisition means information.

FIG. 16 is an explanatory diagram illustrating an example of the memory contents of the configuration estimation information.

FIG. 29 is an explanatory diagram illustrating an example of the memory contents of estimation subject job management information.

DETAILED DESCRIPTION OF THE EMBODIMENTS

The present embodiments, as will be described below, may be implemented in software operating at a general purpose computer, in hardware, or in a combination of hardware dedicated for a particular purpose and software.

In the description below, the information in the memory is stored in table format, but the information need not necessarily be expressed in a table-based data structure, and may instead be expressed as a data structure such as a list, DB, or a queue. In order to express the fact that the type of data structure does not matter, the word "information" may be used for "tables", "lists", "DBs", "queues", and the like. When describing the content of the information, it is possible to use the terms "identification information", "identifier", "name", and "ID", and these terms are interchangeable.

It should be noted that the following description is given by using a "program" as a subject (operation subject) in some cases, but may be given by using a processor as the subject because the program executes predetermined processing by being executed by the processor while using a memory and a communication port (communication control apparatus). Further, a part or all of the programs may be implemented by dedicated hardware, or may be modularized. Various programs may also be installed onto each computer by a program distribution server or via a storage medium.

Embodiment 1

<Specific Example of Configuration of Job Execution>

Figure 1A:
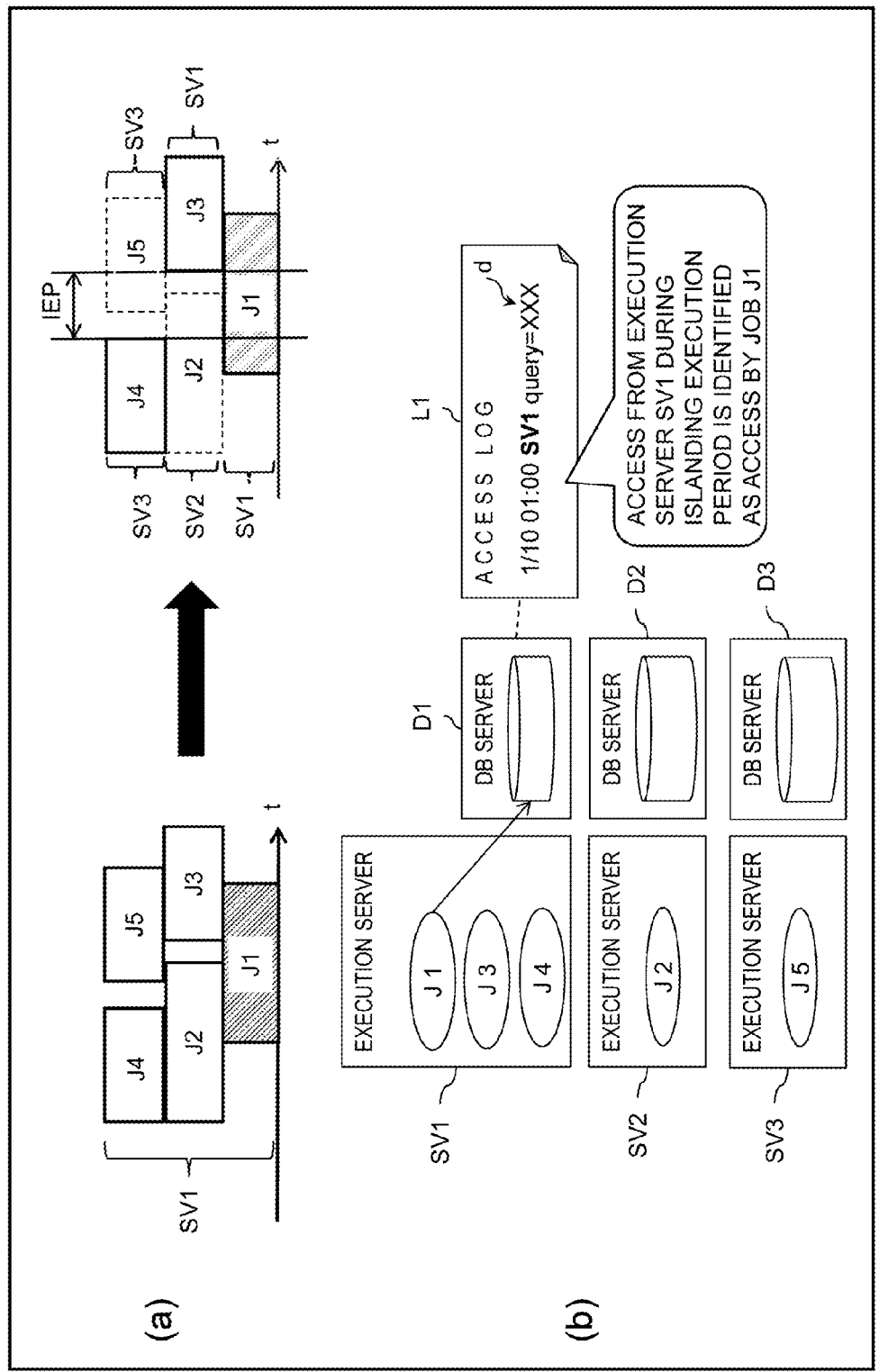
FIG. 1A is an explanatory diagram illustrating a specific example 1 of a configuration of a job execution according to embodiment 1.

FIG. 1A is an explanatory diagram illustrating a specific example 1 of a configuration of a job execution according to embodiment 1. In FIG. 1A, (a) a time period, in which a job whose execution configuration is to be estimated is operated solely at an execution server, is intentionally set, and (b) an example of a process to identify its relationship with a back end server is illustrated. The job whose execution configuration is to be estimated will be referred to as an "estimation subject job." Also, a time period in which an estimation subject job is operated solely at an execution server will be referred to as an "islanding execution time." The processes of (a) and (b) will be executed by a management program of a management server which will be described below.

In (a), the time chart on the left side includes a schedule prior to the islanding execution time (IEP) being set, where an execution server SV1 executes jobs J1 through J5. In the present example, the job J1 includes the estimation subject job. The time chart on the right side illustrates a schedule after the islanding execution time is set.

The management program is configured to change the schedule of jobs other than the estimation subject job so as to provide the islanding execution time of the estimation subject job by changing an execution location of the estimation subject job or that of the jobs other than the estimation subject job. For example, the management program changes the execution location of the job J2 of the other jobs J2 through J5, which exclude the estimation subject job J1, to an execution server SV2, and changes the execution location of the job J5 to an execution server SV3. Such change in the scheduling will enable the accuracy in identifying the run configuration of the estimation subject job to be improved without halting job schedule.

Note that the setting of the islanding execution time IEP of the estimation subject job J1 is realized by rescheduling such that the management program executes the jobs J2 and J5 at the execution servers SV2 and SV3, which are different from the execution server SV1 as illustrated in current schedule. Also, the setting of the islanding execution time IEP of the estimation subject job J1 is realized by rescheduling such that the management program executes the estimation subject job J1 at a different server (not illustrated).

(b) illustrates, as illustrated in the time chart on the right side in (a), an example of an execution result of the execution server SV1 during the islanding execution time IEP after the islanding execution time IEP has been set. According to the present example, each execution server, SV1 through SV3, is operable to access corresponding DB (database) server, D1 through D3, which is included in a back server. Note that the execution servers SV# are operable to access the DB server D# (# denotes a number) having the same reference number. For example, the execution server SV1 is operable to access the DB server D1.

The execution server SV1 accesses the DB server D1 only via the estimation subject job J1 during the islanding execution time IEP. Based on this result, a user is operable to estimate that descriptive data d within access log information L1 of the DB server D1 includes an access from the estimation subject job J1.

Figure 1B:
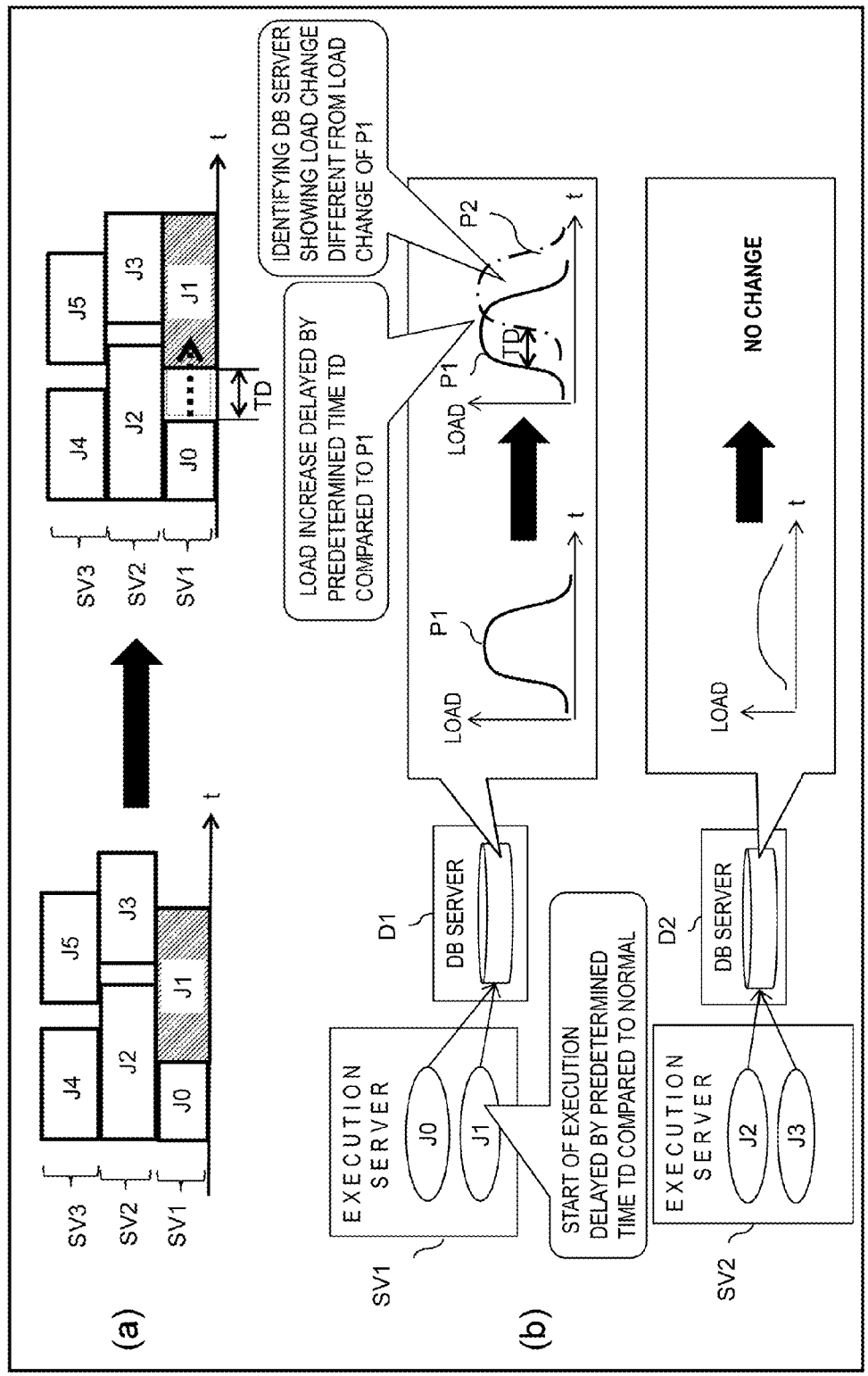
FIG. 1B is an explanatory diagram illustrating a specific example 2 of a configuration of the job execution according to the embodiment 1.

FIG. 1B is an explanatory diagram illustrating a specific example 2 of a configuration of the job execution according to the embodiment 1. FIG. 1B shows (a) an execution timing of the estimation subject job is changed intentionally, and (b) an example of a process to identify its correlation with the back end server by a load change analysis or a log analysis by the back end server.

In (a), the time chart on the left side includes the schedule prior to the change in the execution timing of the estimation subject job, which includes the schedule where the execution server SV1 executes estimation subject jobs J0 and J1, the execution server SV2 executes the estimation subject jobs J2 and J3, the execution server SV3 executes the estimation subject job J5. According to the present example, the job J1 includes the estimation subject job.

The management program is configured to change the schedule so as to change the processing load of the estimation subject job at the back end server by changing the execution time of the estimation subject job. For example, the management program delays the execution start time of the estimation subject job J1 at the execution server SV1 as much as TD as illustrated in the right side of FIG. 1B (a). Such change will enable the accuracy in identifying the run configuration of the estimation subject job to be improved without halting job schedule.

Note that when delaying the execution time of the estimation subject job, the management program is operable to control the load change while minimizing the possibility of the influence on the ongoing job execution by calculating permissible delay time for the execution time based on the previous changes.

(b) illustrates an example of a process to identify its relationship with the back end server as stated above, and an example of the job execution conducted at the execution server SV1 after the change in the execution time as illustrated in the time chart on the right side of (a). According to the present example, the execution start time of the estimation subject job J1 at the execution server SV1 is delayed as much as delay time TD. Prior to the change of the execution time, P1 indicates the pattern of the load change of the load at the DB server D1.

Whereas, after the change of the execution time, the waveform of the load change that indicates the load at the DB server D1 includes the load change pattern P2 in which the load increase is delayed by as much as the delay time TD in comparison to normal circumstances (i.e., load change pattern P1 prior to the change in the execution time). Then, the management program calculates by analyzing the difference between the patterns P1 and P2 the probability of the job, which accessed to the DB server D1 that shows the load as illustrated in the load change pattern P2, includes the estimation subject job J1 of the execution server SV1. By this, it becomes possible to increase the accuracy in identifying the estimation subject job J1. Also, by referencing the probability, a user will be operable to estimate the run configuration of the estimation subject job J1.

<Example of System Configuration of Management System>

Figure 2:
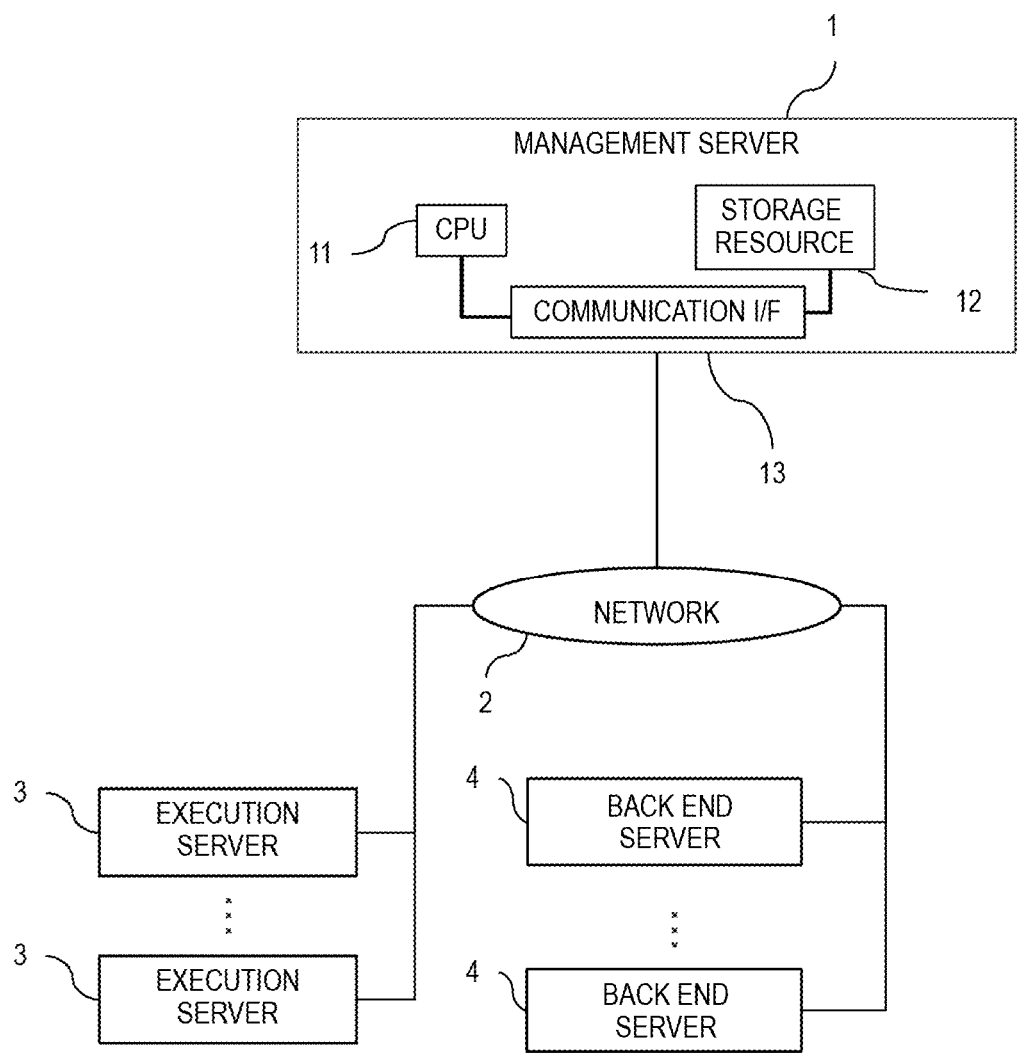
FIG. 2 is a block diagram illustrating an example of a system configuration of the management system according to embodiment 1.

FIG. 2 is a block diagram illustrating an example of a system configuration of the management system according to embodiment 1. The management server 1, which is a computer configured to manage job execution methods and job configuration estimation methods, includes a CPU 11, a storage resource 12, and a communication interface (communication I/F) 13. As will be described below, the storage resource 12 is configured to store therein various types of information of the management program and jobs, while the CPU 11 is configured to perform various types of management processes by implementing the management program. Note that the storage resource 12, which may include an HDD (Hard Disk Drive), a flash memory, a DRAM, and/or a combination thereof, may be replaced by any device, provided that the device is operable to store therein programs and information.

An execution server 3, which includes a computer configured to receive a job execution request from the management server 1 and execute a job, is managed by the management server 1 via a network 2. A back end server 4, which includes a computer that will be called when executing a job by the execution server 3, is connected to the execution server 3 via the network 2. The back end server 4 is configured to handle some of the processes pertaining to job executions. The back end server 4 may include the DB server or a file server, for example. Also, note that any one of the servers 1, 3, or 4 may include a physical machine or a virtual machine.

<Configuration of Management Server 1>

Figure 3:
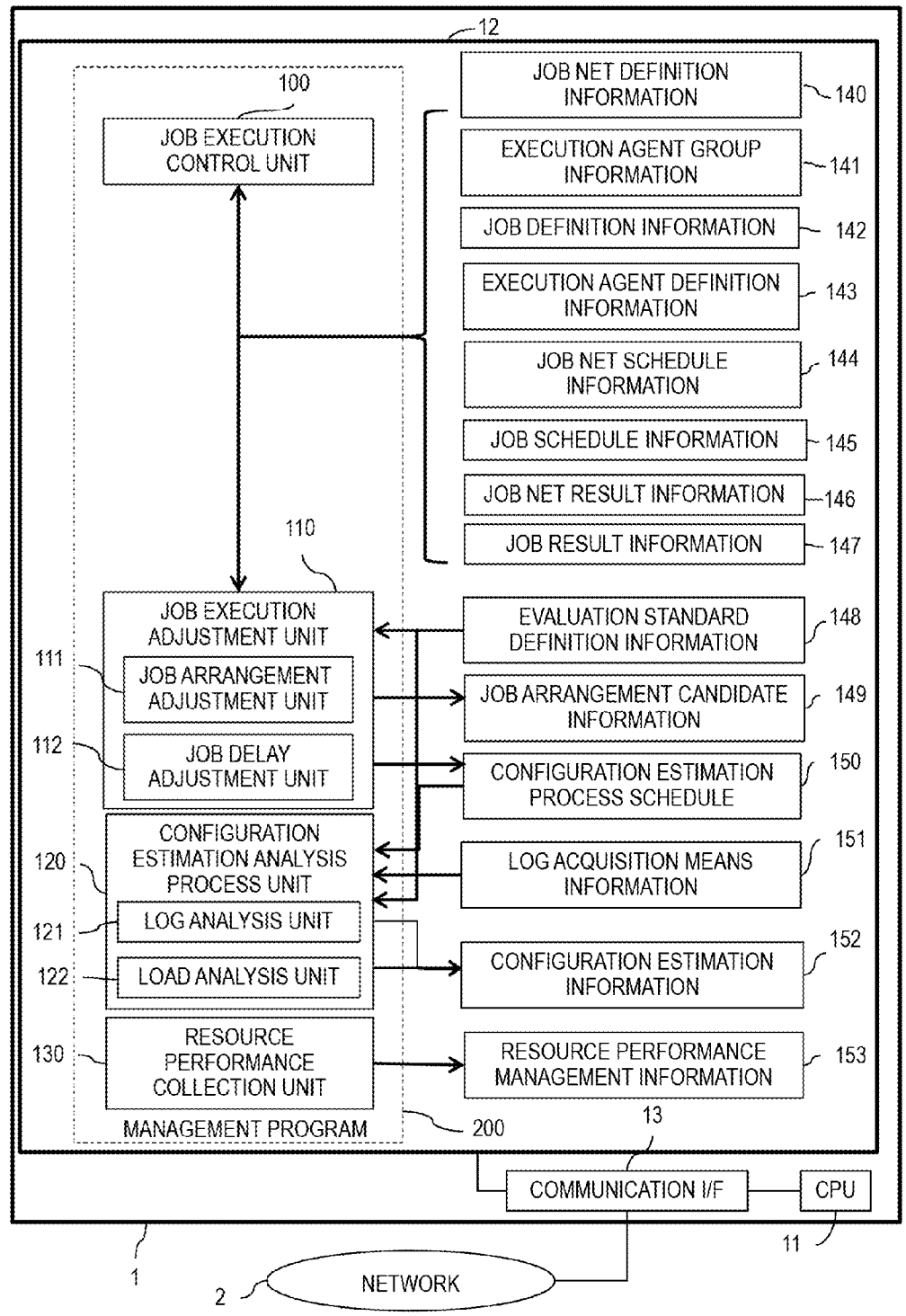
FIG. 3 is a block diagram illustrating in detail an example of a configuration of the management server 1.

FIG. 3 is a block diagram illustrating in detail an example of a configuration of the management server 1. The management server 1 includes the CPU 11, which is configured to implement the management program 200, the storage resource 12, which is configured to store the management program 200, and the communication I/F 13, which is connected to the network 2. The management program 200 includes programs such as a job execution control unit 100, a job execution adjustment unit 110, a configuration estimation analysis process unit 120, and a resource performance collection unit 130.

The job execution control unit 100 controls a predetermined job such that said job is executed at a predetermined timing based on job net definition information 140 through 145 that are defined by a user. The job execution control unit 100, when the execution of said job is completed, stores the time required to process said job as an actual value at job net result information 146 and job result information 147.

The job execution adjustment unit 110 includes a job arrangement adjustment unit 111 configured to adjust, out of the job net definition information 140 through 145, the information concerning a location of a job execution, and a job delay adjustment unit 112 configured to adjust an execution time for a job. The job execution adjustment unit 110 creates job arrangement candidate information 149 and an analysis subject schedule 150 which will be described below.

The configuration estimation analysis process unit 120 includes a log analysis unit 121, which is configured to estimate a job execution configuration by analyzing log information after a job execution, and a load analysis unit 122, which is configured to estimate a job execution configuration by analyzing a process load of a job execution. The configuration estimation analysis process unit 120 creates configuration estimation information 152, which will be described below.

The resource performance collection unit 130 is configured to collect the performance information of the execution server 3 and the back end server 4 at fixed intervals, and store the performance information respectively in resource performance history information 153. Note that the performance information, which is only required to include the information related to resources that are consumed during an execution of a job, may additionally include, for example, the use rate of the CPU 11 or the use rate of the memory of the execution server 3 and/or the back end server 4, a disk IOPS (Input/Output Per Seconds), or the use rate of the network bandwidth.

Also, the storage resource 12 stores therein information 146 through 153 in addition to the job net definition information 140 through 145. Hereinafter, the stored information 140 through 153 will be described.

<Exemplary Memory Content of Information>

Figures 4, 5, 6:
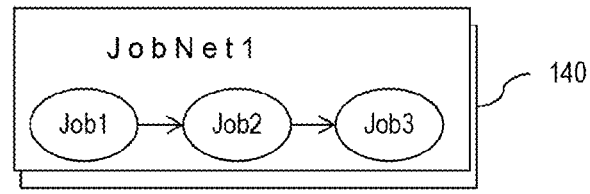
FIG. 4 is an explanatory diagram illustrating an example of the memory contents of job net definition information.
FIG. 5 is an explanatory diagram illustrating an example of the memory contents of execution agent group information.
FIG. 6 is an explanatory diagram illustrating an example of the memory contents of job definition information.

FIG. 4 is an explanatory diagram illustrating an example of the memory contents of job net definition information 140. The job net definition information 140 includes a definition of a job net denoting an order of executions of a plurality of the jobs which are executed in a series of processes. The job net definition information 140, which is created for each job net, may be registered, modified, or deleted by the operation of an administrator of the management server 1. As illustrated in FIG. 4, the job net "Job Net 1" is defined such that the third job, "Job 3," is executed after the second job, "Job 2," which is executed after the first job, "Job 1," for example.

FIG. 5 is an explanatory diagram illustrating an example of the memory contents of execution agent group information 141. The execution agent group information 141 includes the information that defines the correlation between an execution agent group 501 and an execution agent 502. The execution agent group 501 includes the information that defines a plurality of the execution agents 502 as a single group. An execution agent 602 includes the information that defines the execution agent that executes a job at the execution server 3. According to the example illustrated in FIG. 5, the jobs that belong to "Agt Grp 1," which is the execution agent group 501, may be executed by an either execution agent, "Agent 10" or "Agent 20." Note that the entries in the execution agent group information 141 may be registered, modified, or deleted by the operation of an administrator of the management server 1.

FIG. 6 is an explanatory diagram illustrating an example of the memory contents of job definition information 142. The job definition information 142 includes the information that defines the correlation between a job name 601 and an execution agent 602. The entries in the job definition information 142 may be registered, modified, or deleted by the operation of an administrator of the management server 1. In case each execution agent is independently defined at the execution agent 602, the execution agent for a job will be determined uniquely. For example, the entry in the second row shows that the job whose job name 601 is "Job 2" will be executed by the execution agent whose execution agent 602 is "Agent 2."

Also, in case any one of the execution agent groups of the execution agent group 501 of FIG. 5 is defined at the execution agent 602, the execution agent of said job belongs to any one of the execution agents included in the execution agent group. For example, the entry in the first row shows that the job whose job name 601 is "Job 1" will be executed by any one of the execution agents (i.e., "Agent 10" or "Agent 20") of the execution agent group whose execution agent 602 is "AgtGrp 1."

For the execution agent within the execution agent group, the management program 200 may select by the operation of an administrator of the management server 1 the execution agent having the smallest process load during a job execution, or based on the past job results.

FIG. 7 is an explanatory diagram illustrating an example of the memory contents of an execution agent definition information 143. The execution agent definition information 143 includes the information that defines the correlation between an execution agent 701 and an execution server 702, and that shows which execution agent is being executed by which particular execution server. The execution agent definition information 143 is registered, modified, or deleted by the operation of an administration of the management server 1. The information of the execution server 702, which is only required to uniquely identify the execution server, may, as illustrated in FIG. 7, designate a host name (e.g., SV1) of the execution server, or include an IP address of the execution server, or the information that is registered at the DNS (Domain Name System) server.

FIG. 8 is an explanatory diagram illustrating an example of the memory contents of job net schedule information 144. The job net schedule information 144 includes the information that defines the correlation among a job net name 801, a scheduled start time 802 of a job net, a scheduled end time 803 of the job net, a scheduled execution period 804 of the job net, an end date 805 of the job net, and an execution timing 806 of the job net.

The job net name 801 includes the name of a job net that is defined in the job net definition information 140 of FIG. 4. The scheduled start time 802, which is registered, modified, or deleted by the operation of an administration of the management server 1, includes the time information concerning when the job execution control unit 100 starts the process of the job net designated by the job net name 801. The scheduled end time 803, which is generated by the job execution control unit 100 based on the job net result information 146 (described below), includes the time information concerning when the job net which is designated by the job net name 801 ends a process. A method to generate the scheduled end time 803 may include the job net result information 146 from the previous day as is, or an average value of the job net result information 146 from nearest preceding days, for example.

The scheduled execution period 804, which is generated by the job execution control unit 100 from the difference between the scheduled start time 802 and the scheduled end time 803, includes the time information concerning the time required to execute the job net which is designated by the job net name 801. The end date 805, which is registered, modified, or deleted by the operation of an administration of the management server 1, includes the time information concerning by what time the process of the job net, which is designated by the job net name 801, needs to be finished. The execution timing 806, which is registered, modified, or deleted by the operation of an administration of the management server 1, includes the timing information concerning when the job net, which is designated by the job net name 801, is executed. Note that the timing information may be designated as "everyday" as illustrated in FIG. 8, or as "week end," or "end of month" in a similar manner, or may be designated by a specific day of the month or the week.

FIG. 9 is an explanatory diagram illustrating an example of the memory contents of job schedule information 145. The job schedule information 145 includes the information that defines the correlation among a job name 901, a scheduled start time 902 of a job, and a scheduled end time 903 of the job. The job name 901 includes the information that is defined by the job name 601 of the job definition information 142 of FIG. 6. The scheduled start time 902 and the scheduled end time 903, which are generated by the job execution control unit 100 based on the job result information 147 (described below), include the scheduled start time and the scheduled end time of the job that is designated by the job name 901. A method to generate the scheduled start time 902 and the scheduled end time 903 may include the job result information 147 from the previous day as is, or an average value of the job result information 147 from nearest preceding days, for example.

FIG. 10 is an explanatory diagram illustrating an example of the memory contents of the job net result information 146. The job net result information 146 includes the information that defines the correlation among a job name 1001, a result start date and time 1002 of a job, and a result end date and time 1003 of the job. The job name 1001 includes the name of the job net that is defined by the job net definition information 140 of FIG. 4. The result start date and time 1002, which is generated by the job execution control unit 100, includes a date and time in which the job that is designated by the job net name 1001 actually started. The result end date and time 1003, which is generated by the job execution control unit 100, includes a date and time in which the job net that is designated by the job net name 1001 actually completed the process.

FIG. 11 is an explanatory diagram illustrating an example of the memory contents of the job result information 147. The job result information 147 includes the information that shows when a job starts and when the job ended. The job result information 147 includes the information that defines the correlation among a job name 1101, a result start date and time 1102 of a job, and a result end date and time 1103 of the job. The job name 1101 includes the name of the job net that is defined by the job net definition information 142 of FIG. 6. The result start date and time 1102, which is recorded by the job name 1101, includes a date and time in which the job that is designated by the job definition information 142 actually started. The result end date and time 1103, which is recorded by the job execution control unit 100, includes a date and time in which the job that is designated by the job name 1101 actually completed the process.

FIG. 12 is an explanatory diagram illustrating an example of the memory contents of an evaluation standard definition information 148. The evaluation standard definition information 148, which includes the information that defines the correlation between an evaluation item 1201 and an evaluation standard definition 1202, includes the information that is used as a threshold value for setting the islanding execution time IEP or an analysis of an access log as shown in FIG. 1A, or for setting a delayable time Td or an analysis of the load change analysis as shown in FIG. 1B, for example. The evaluation item 1201 and the evaluation standard definition 1202, which include the information that is used during a change in an analysis subject schedule and a configuration estimation analysis process which will be described below, are registered, modified, or deleted by the operation of an administration of the management server 1. The evaluation item 1201 includes the information that defines a type of an evaluation standard. The evaluation standard definition 1202 includes the information that defines the detail of the evaluation standard designated by the evaluation item 1201.

For example, a "minimum islanding execution time" in the evaluation item 1201 stores therein "10 minutes" as an example of the evaluation standard definition 1202 which is deemed valid for an islanding execution for the estimation subject job so as not to overlap with the execution time of other jobs. That is, the example in FIG. 12 shows that at least 10 minutes is needed for the islanding execution time IEP. Also, "minimum delay time" in the log analysis unit 121 stores therein "15 minutes" as an example of the evaluation standard definition 1202. That is, the example in FIG. 12 shows that at least 15 is needed for the delayable time Td.

Also, "overlap value" in the evaluation item 1201 stores therein "equal to or more than 80%" as an example of the evaluation standard definition 1202. The "overlap value" will be described below.

"Log evaluation standard" in the evaluation item 1201 indicates the standard for the log which will be a subject for evaluation. The "log evaluation standard" in the evaluation item 1201 stores therein "○○/min." and "near central time" as examples of the evaluation standard definition 1202. The "○○/min." indicates the minimum number of accesses required per minute. That is, it will be determined that an access took place when there are more or an equal number of accesses than what is indicated in "○○/min.," and that an access did not take place when there are less number of accesses than what is indicated in "○○/min."

Also, the "near central time" means that an access log of a predetermined scope having a central time at the center thereof for the islanding execution time IEP will become a subject for evaluation. Since at the time other than the central time of the islanding execution time IEP there may be accesses from the estimation subject job mixed with those from other jobs, the access occurring near the central time will be determined as the access from the estimation subject job.

Also, "log time series standard" in the evaluation item 1201 indicates a log time series which will be a subject for evaluation. The "log time series standard" in the evaluation item 1201 stores therein "order for data process by execution server immediately after data acquisition from DB" as an example of the evaluation standard definition 1202. That is, the waveform of the load change will be generated for the log that indicates said order, and the log will be counted as the number for access log.

Also, "evaluation of difference" in the evaluation item 1201 includes the information indicating the difference of load that is minimally necessary. The "evaluation of difference" in the evaluation item 1201 stores therein "CPU utilization rate 30%" as an example of the evaluation standard definition 1202.

Also, "evaluation of adjustment" in the evaluation item 1201 includes the information that defines which adjustment method will be used between arrangement adjustment (FIG. 1A) and delay adjustment (FIG. 1B). As an example of the evaluation standard definition 1202, a ratio of the arrangement adjustment (FIG. 1A) and the delay adjustment (FIG. 1B) (e.g., 4:1, or evenly, arrangement only, or delay only) may be set up.

FIG. 13 is an explanatory diagram illustrating an example of the memory contents of the job arrangement candidate information 149. The job arrangement candidate information 149 includes the information that defines the correlation among an estimation subject job name 1301, an execution server 1302, an islanding execution time 1303, a coexisting job name 1304, and a transfer job information 1305. The method to generate the job arrangement candidate information 149, which is generated by the job execution adjustment unit 110, will be described below in detail. The estimation subject job name 1301 stores therein the name of a job (name of the estimation subject job) which will be a subject of estimation of the job execution configuration. The execution server 1302 stores therein the information (e.g., "SV1") that designates the execution server 3 at which the job designated by the estimation subject job name 1301 is executed. The islanding execution time 1303 stores therein the islanding execution time IEP which is a period in which the estimation subject job designated by the estimation subject job name 1301 is executed individually at the execution server 1302. The coexisting job name 1304 stores therein the names of other jobs that are executed at the same execution server 1302 while the estimation subject job designated by the estimation subject job name 1301 is being executed.

The transfer job information 1305 stores therein the information of the job transfer destination to another execution server 3 from the execution server 1302 and the destination to which said job is transferred. According to the example in FIG. 13, it is shown that, when an estimation subject job "Job 1" is executed at the execution server "SV 1," the islanding execution time IEP in which the "Job 1" is executed individually at the "SV1" includes "01:00 to 01:20," that there are "Job 2" and "Job 3" that will be executed at the "SV 1," and that "Job 4" and "Job 5" will be changing their execution servers 3 to "SV 4" and "SV 2," respectively.

FIG. 14 is an explanatory diagram illustrating an example of the memory contents of the analysis subject schedule 150. The analysis subject schedule 150 includes a schedule of the job which will be a subject of analysis by the configuration estimation analysis process unit 120. The analysis subject schedule 150 includes the information that defines the correlation among an estimation subject job name 1401, an operation job name 1402, an execution server 1403, a scheduled start time 1404, a scheduled end time 1405, an estimation process period 1406, a configuration estimation method 1407, and status information 1408.

The method to generate the analysis subject schedule 150, which is generated by the job execution adjustment unit 110, will be described below in detail. The estimation subject job name 1401 indicates the name of a job (name of the estimation subject job) to which a job execution adjustment process (described below) is applied. The operation job name 1402 indicates the job name of the job in which the job net schedule information 144 and/or the job schedule information 145 are operated (i.e., modified) by the job execution adjustment. That is, the modification operation job refers to the jobs J2 and J5, which will be transferred from the execution server SV1, out of the other jobs J2 to J5 illustrated in (a) in FIG. 1A. The execution server 1403 indicates the execution server 3 where the job which is indicated at the operation job name 1402 is executed.

The scheduled start time 1404 indicates the time at which the execution of the job indicated at the operation job name 1402 starts, and when the value of the estimation subject job name 1401 includes "–", it means that no modification operation will be conducted with respect to the existing 144 and/or the job schedule information 145. The scheduled end time 1405 indicates the schedule time at which the execution of the job indicated at the operation job name 1402 ends, and when the value of the operation job name 1402 includes "–", it means that no modification operation will be conducted with respect to the existing 144 and/or the job schedule information 145. The estimation process period 1406 indicates the period information which will be used during the configuration estimation analysis process which will be described below. When the adjustment method includes "arrangement adjustment", the estimation process period 1406 indicates the islanding execution time IEP of the estimation subject job which is designated by the estimation subject job name 1401, and, when the adjustment method includes "delay adjustment", the estimation process period 1406 indicates a period in which the processing loads of the estimation subject jobs are compared (e.g., 2nd overlapping time period p2 illustrated in FIG. 18).

The configuration estimation method 1407 indicates which configuration estimation method (described below) will be applied in order to estimate the job execution configuration of the estimation subject job designated by the estimation subject job name 1401. The status information 1408 indicates the information related to the status of the analysis subject schedule 150 such as "execution registration" or "executed". The "execution registration" indicates that the forthcoming schedule specified at the corresponding entry has been registered; when the schedule has been registered, the status information 1408 of said entry will be set as "execution registration."

Also, a date and time will be set along with the "execution registration". This date and time denotes the scheduled execution day of the forthcoming schedule specified in said entry. Accordingly, "2014/1/28 Execution registration" indicated in the status information 1408 of the first row means 'job processing of the entry that will be executed on 2014/1/28 has been registered at the analysis subject schedule 150.'

Also, "executed" indicates that the schedule specified in the entry has been executed; when the schedule is executed, the status information 1408 will be updated from "execution registration" to "executed." The status information 1408 is set and updated by the process of the job execution adjustment unit 110 and the configuration estimation analysis process unit 120, which will be described below.

FIG. 15 is an explanatory diagram illustrating an example of the memory contents of log acquisition means information 151. The log acquisition means information 151 includes the information that defines the correlation among a server name 1501, software information 1502, a log pass 1503, and an acquisition means 1504. The server name 1501 indicates the information that uniquely identify the execution server 3 or the back end server 4. The information for the server name 1501 may be inputted by an administrator, or acquired from another management system to be stored therein, or, when the execution environment for a batch job includes a virtualized environment, obtained from a virtual management system to be stored therein. Also, the server name 1501 may designate a host name of a server as illustrated in FIG. 15, or designate an IP address of a server, or the information that is registered at the DNS server.

The software information 1502 indicates the information that uniquely identifies the software that operates at the server designated by the server name 1501. The software may include database management software or webserver management software, for example. The information for the software information 1502 may be inputted by an administrator, or acquired from another management system to be stored therein, or identified by analyzing process information of a program that operates at the server name 1501.

The log pass 1503 indicates the information concerning the storage to which the software (designated by the software information 1502), which operates at the server designated by the server name 1501, outputs a log. The information for the log pass 1503 may be inputted by an administrator, or acquired from another management system to be stored therein. The acquisition means 1504 indicates the means for acquiring the management information which includes the log pass 1503. The information for the acquisition means 1504 may be inputted by an administrator, or acquired from another management system to be stored therein.

FIG. 16 is an explanatory diagram illustrating an example of the memory contents of the configuration estimation information 152. The configuration estimation information 152, which includes the information indicating an analysis result of an analysis conducted by the configuration estimation analysis process unit 120, includes the information that defines the correlation among an estimation subject job name 1601, a back end server 1602, and an evaluation value 1603. The method to generate the configuration estimation information 152, which is generated by the configuration estimation analysis process unit 120, will be described below in detail. The estimation subject job name 1601 is defined by the estimation subject job name 1401 of the analysis subject schedule 150 in FIG. 14. The back end server 1602 includes the server that is estimated by the configuration estimation analysis process, which will be described below, to be a portion the job execution configuration of the estimation subject job designated by the estimation subject job name 1601. The evaluation value 1603 stores therein a value indicating a degree of reliability of the estimation by the back end server 1602. The evaluation value 1603, which is only required to include a value indicating the degree of reliability, may include level information such as "high," "medium," and "low," numerical information such as "1," "10," and "100," or binary information such as "O" or "X," for example.

Figures 17, 18:
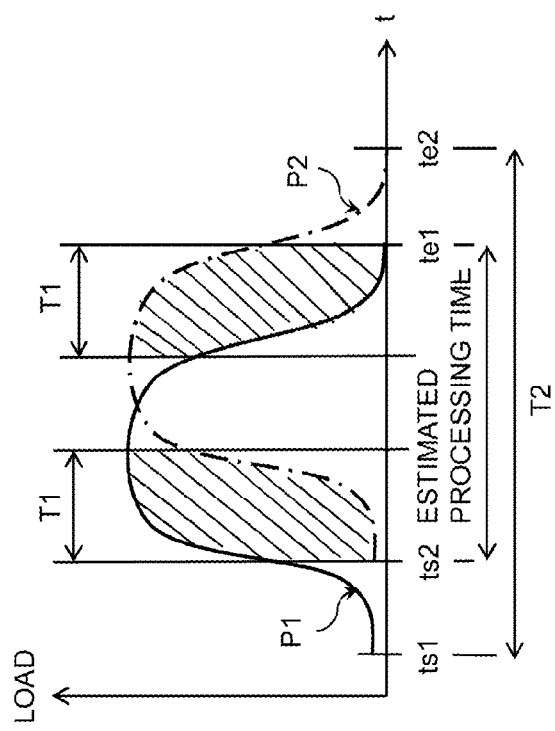
FIG. 17 is an exemplary diagram illustrating the resource performance history information.
FIG. 18 is an explanatory diagram illustrating an example of the configuration estimation analysis which utilizes the overlap value, the evaluation of difference, and the estimation process period.

FIG. 17 is an exemplary diagram illustrating the resource performance history information 153. The resource performance history information 153 includes the information that defines the correlation among an acquisition date and time 1701, a CPU use rate 1702, a memory use rate 1703, a disk I/O use rate 1704, and a network I/O use rate 1705.

The resource performance history information 153 is generated by the resource performance collection unit 130 for each execution server 3 and each back end server 4. The acquisition date and time 1701 indicates the information concerning date and time in which the resource performance collection unit 130 collects information. Each resource performance information 1702 through 1705 indicates a value of an item collected by the resource performance collection unit 130. Note that although the use rates are used for each resource performance information 1702 through 1705 according to the present embodiment, the present invention is not limited thereto; an actual amount used for each item may be included. Also, an IOPS may be used for the performance information of the disks, wherein the disk read performance and the write performance may be acquired separately to be stored therein. Also, the network performance information may include the amount of network bandwidth used or the amount of request per unit time, and furthermore, the amount of transmission and the amount of reception of a communication interface may be acquired separately to be stored therein.

Here, the relationship among the overlap value, the evaluation of difference, and the estimation process period 1406 illustrated in FIG. 14 will be described. The overlap value, the evaluation of difference, and the estimation process period 1406 are used for the configuration estimation analysis in the delay adjustment illustrated in FIG. 1B. Note that the estimation process period 1406 described herein includes an estimation process period when the configuration estimation method 1407 includes the "delay adjustment."

FIG. 18 is an explanatory diagram illustrating an example of the configuration estimation analysis which utilizes the overlap value, the evaluation of difference, and the estimation process period. The graph illustrated in FIG. 18 is an enlarged diagram of the graph illustrated in FIG. 1B. The horizontal axis indicates time, while the vertical axis indicates the load (i.e., CPU use rate). P1 indicates the load change pattern that is obtained from past actual values pertaining to the estimation subject job, while P2 indicates the load change pattern on the day when a delay adjustment as much as the delayable time Td was made pertaining to the estimation subject job. Note that ts1 indicates the execution start time of the load change pattern P1; te1 indicates the execution end time of the load change pattern P1; ts2 indicates the execution start time of the load change pattern P2; and te2 indicates the execution end time of the load change pattern P2.

The period between the execution start time ts2 and the execution end time is ts1, which includes a period where the patterns P1 and P2 overlap with one another, includes the estimation process period 1406. In estimation process period 1406, the total sum T1, which includes periods T1*a* and T1*b* (shaded portion) where the difference between the patterns P1 and P2 at the same time is equal to or greater than a predetermined value (i.e., a value of the evaluation of difference. In FIG. 12, CPU use rate of equal to or more than 30%), includes a period that is influenced by a delay (delay-influenced period). Note that the period between an execution start time ts1 and an execution end time ts2, which is a period inclusive of the patterns P1 and P2, includes an evaluation subject period T2.

<Procedure of Execution by Management Program 200>

Next, the procedure of the execution conducted by the management program 200 will be described.

Figure 19:
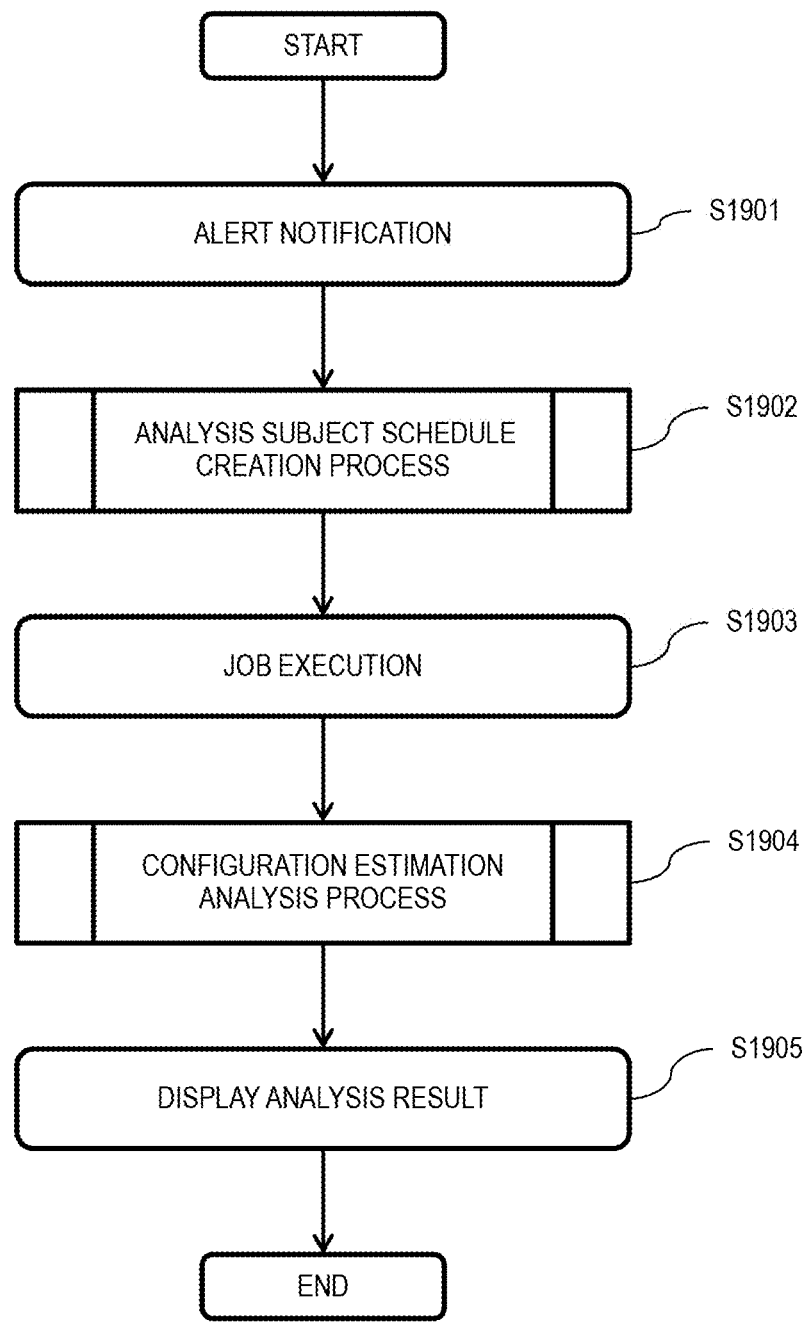
FIG. 19 is a flowchart illustrating an entire procedure of the execution conducted by the management program according to embodiment 1.

FIG. 19 is a flowchart illustrating an entire procedure of the execution conducted by the management program 200 according to embodiment 1. The management program 200 is configured to give a notification by sending an alert (Step S1901). To be more specific, the management program 200 monitors the job net result information 146 and/or the job result information 147 so as to identify the job appearing to have sign of a delay in the job execution time, and calculate grace period information concerning the period until the end period 805 for the job net schedule information 144. Then, the management program 200 notifies a user with such results by sending an alert.

Note that the calculation means for the sign of delays and the grace period information may include mathematical means or statistical means. For example, in determining the sign of delays, the management program 200 may arrange the results of the execution end time for jobs for each day of a relevant period in a time series, and determine there is a sign for a delay when the results exceed the end date 805 of the job net schedule information 144 in FIG. 8 predetermined number of times consecutively. Also, the management program 200 may arrange the results of the execution end time for jobs for each day of a relevant period in a time series, and calculate a predicted value of the future execution end time by regressive analysis so as to calculate the grace period information by calculating the difference between the present day and the day predicted to exceed the end period 805, for example. The management program 200 is configured to notify a user by displaying a job name and the grace period information of a job which is determined to have a sign for a delay.

Note that such alert may include a deadline by which a creation process of an analysis subject schedule must be created (Step S1902) for each estimation subject job which is determined to have a sign for a delay. Such deadline may be set in a predetermined number of days from the date an alert is issued by the management program 200, for example.

Next, the management program 200 executes the creation process of the analysis subject schedule (Step S1902). To be more specific, the management program 200, for example, calls the job execution adjustment unit 110, receives a request for a configuration estimation from a user, and creates the analysis subject schedule 150 illustrated in FIG. 14 for a job, which was included in the alert of Step S1901, in order to execute the configuration estimation analysis process of said job (Step S1904). The details of this process will be described below with reference to FIG. 21.

Next, the management program 200, in accordance with the job net schedule information 144 of FIG. 8, has the execution server 3 execute each job (S1903).

Next, the management program 200 calls the configuration estimation analysis process unit 120, and executes the configuration estimation analysis process of the job by utilizing the job's log information and the resource performance information after the job execution in Step S1903

(S1904). The details of this process will be described below with reference to FIG. 26. The configuration estimation analysis process (Step S1904) can identify the job that accessed the back end server 4 as illustrated in FIG. 1A and FIG. 1B.

Finally, the management program 200 displays on a display screen the results of the analysis of the configuration estimation analysis process (Step S1904) (Step S1905). The management program 200 displays the configuration estimation information 152 including the results of the analysis of the configuration estimation analysis process (Step S1904) on the display screen.

Figure 20:
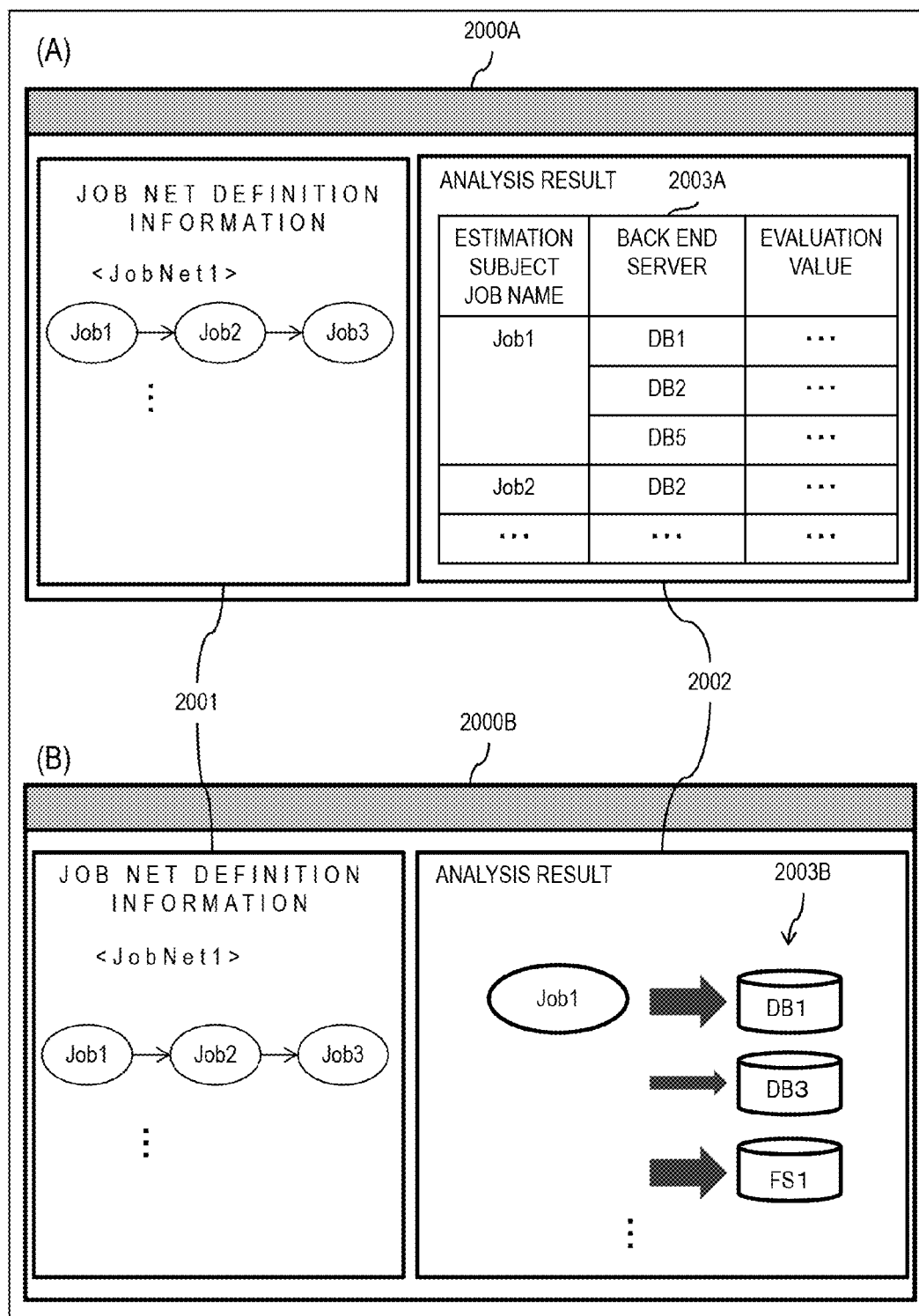
FIG. 20 is an explanatory diagram illustrating an example of the display of the analysis results.

FIG. 20 is an explanatory diagram illustrating an example of the display of the analysis results. (A) illustrates an example of the analysis results of the configuration estimation analysis process (Step S1904) displayed in a tabular form. (B) illustrates an example of the analysis results of the configuration estimation analysis process (Step S1904) displayed in a topological form. Display screens 2000A and 2000B in both (A) and (B) include a job net tree domain 2001 and an analysis result domain 2002. The job net tree domain 2001 displays the job net including the job, which was the estimation subject in the configuration estimation analysis process (Step S1904), in a tree structure. When the management program 200 receives, via an operation by a user at an input apparatus, in the job net tree domain 2001 a selection of a job (e.g., "Job 1") that is within the job net, the configuration estimation analysis results 2003A and 2003B concerning the selected job will be displayed at the analysis result domain 2002.

Although the configuration estimation analysis result 2003A illustrated herein includes an example where the configuration estimation information 152 is displayed as is, the display method does not need to include a tabular form; each value from the configuration estimation analysis results of Step S1904 may be arranged in another display method; or link information to the configuration estimation analysis result 2003A may be displayed as well.

The configuration estimation analysis result 2003B illustrated herein includes an example where the configuration estimation information 152 is displayed in a topological form. With the configuration estimation analysis result 2003B in which the degree of reliability of the relationship between a job and a back end server (evaluation value 1603) is denoted by the thickness of the arrows, a user is operable at first glance to confirm which server is estimated to provide strongest relationship. Also, the configuration estimation analysis result 2003B may be correlated with the configuration management system in which the configuration estimation analysis result 2003B is displayed in a manner to overlay on the screen illustrating the network topology, for example.

Figure 21:
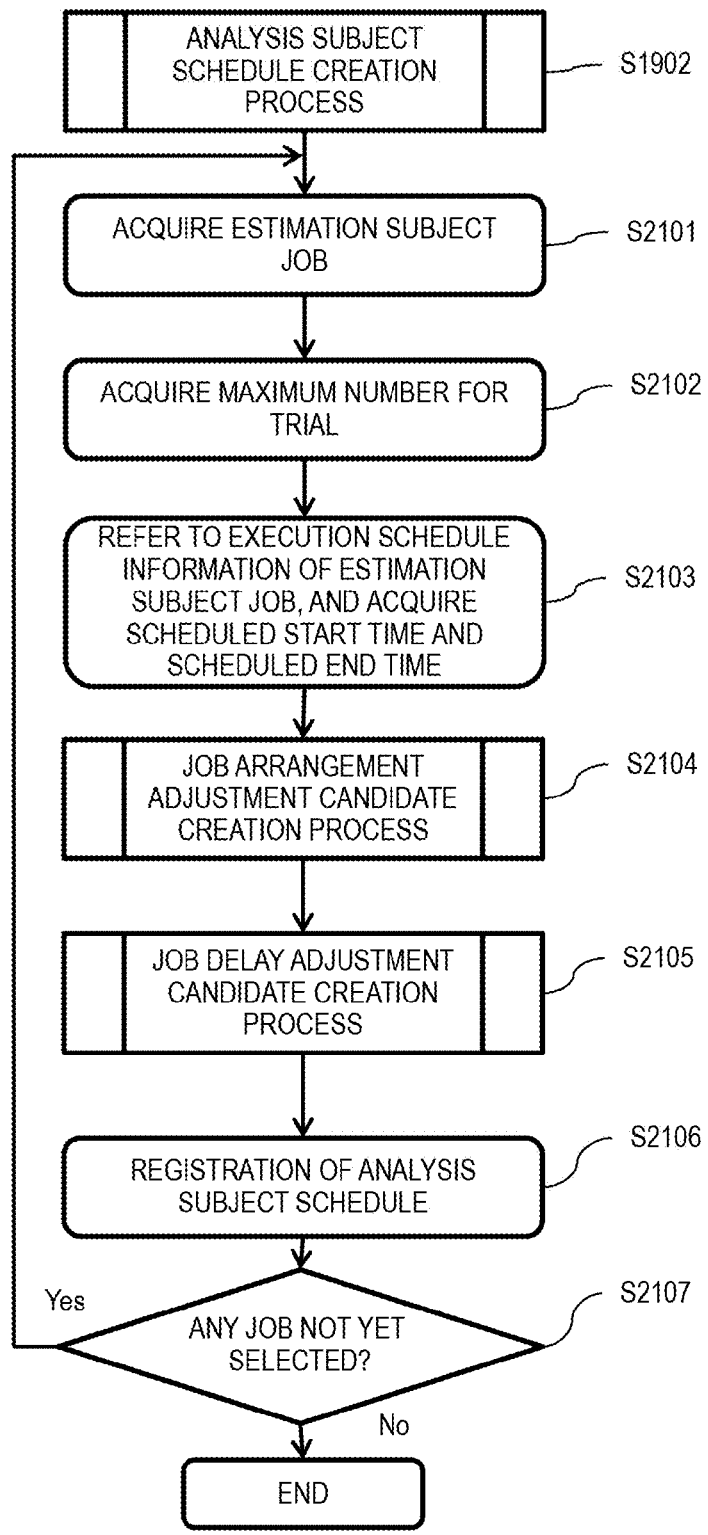
FIG. 21 is a flowchart illustrating a procedure of the creation process (Step S1902) of the analysis subject schedule by the job execution adjustment unit.

FIG. 21 is a flowchart illustrating a procedure of the creation process (Step S1902) of the analysis subject schedule by the job execution adjustment unit 110. Firstly, the job execution adjustment unit 110 acquires a job that is not yet selected out of the group of jobs having a sign of a delay included in a notified alert as an estimation subject job (Step S2101).

Next, the job execution adjustment unit 110 acquires a maximum number of trial with respect to the estimation subject job (Step S2102). The maximum number of trial includes a maximum value for the number of trial for the creation process (Step S1902) of the analysis subject schedule 150 in order to generate an entry of the analysis subject schedule 150 with respect to the estimation subject job by the deadline (which is included in the alert) by which the analysis subject schedule 150 must be created by executing the creation process (Step S1902) of the analysis subject schedule 150 with respect to the estimation subject job.

For example, the alert notification date of Step S1901 of the "Job 1" which is the estimation subject job is 1/27, while the above stated deadline for the "Job 1" which is the estimation subject job is 2/1. When the job tree that includes the estimation subject job includes a batch job group which is executed once per day, the maximum number of trial is 4. Accordingly, the job execution adjustment unit 110 creates an entry such that an execution will be conducted for the "Job 1" for each of 4 days between 1/28 through 1/31 at the analysis subject schedule 150. For example, referring to FIG. 14, 4 entries are registered for the "Job 1" whose execution dates include 1/28 through 1/31 (see status information 1408).

Also, the configuration estimation method 1407 at the entry of the analysis subject schedule 150, which will be created as many as the maximum number of trial, will be determined by the contents of the evaluation standard definition 1202 of "ratio of arrangement and delay" included in the evaluation item 1201 of the evaluation standard definition information 148 in FIG. 12. For example, when the evaluation standard definition 1202 includes "evenly", the maximum number of trial is evenly divided. For example, according to the above stated example of the "Job 1", since the maximum number of trial is 4, there will 2 arrangement adjustments and 2 delay adjustments. That is, for example, the management program 200 will be conducting a job arrangement adjustment candidate creation process (Step S2104), which will be described below, 2 times: once on 1/28 and once on 1/29, and a job delay adjustment candidate creation process (Step S2105) 2 times: once on 1/30 and once on 1/31 with respect to the "Job 1."

Note that when the maximum number of trial includes an odd number, one of the adjustments may be conducted one more time than the other. Also, the maximum number of trial may be accepted as user input information and excluded from the alert; when there is no user input information, the management program 200 may include a fixed value.

Next, the job execution adjustment unit 110 refers to the job schedule information 145 illustrated in FIG. 9 so as to acquire the scheduled start time and the scheduled end time of the estimation subject job (Step S2103).

Next, the job execution adjustment unit 110 calls the job arrangement adjustment unit 111 to have the job arrangement adjustment candidate creation process executed (Step S2104). The job arrangement adjustment candidate creation process (Step S2104) includes a process, as illustrated in FIG. 14, where the configuration estimation method 1407 creates an entry which includes "arrangement adjustment". The details of the job arrangement adjustment candidate creation process (Step S2104) will be described below with reference to FIG. 22.

Next, the job execution adjustment unit 110 calls the job delay adjustment unit 112 to have the job delay adjustment candidate creation process executed (Step S2105). The job delay adjustment candidate creation process (Step S2105) includes a process, as illustrated in FIG. 14, where the configuration estimation method 1407 creates an entry which includes "delay adjustment". The details of the job delay adjustment candidate creation process (Step S2105) will be described below with reference to FIG. 25.

Next, the job execution adjustment unit 110 executes the registration process of the analysis subject schedule 150 created at the job arrangement adjustment candidate creation process (Step S2104) and the job delay adjustment candidate creation process (Step S2105) (Step S2106). To be more specific, for example, the job execution adjustment unit 110 refers to the entry in the analysis subject schedule 150 so as to register information identified by the entry in the job net schedule information 144 and/or the job schedule information 145.

To be more specific, for example, in a case of the job net schedule information 144, the job execution adjustment unit 110 identifies the job net name (e.g., "JobNet 1") from the job net definition information 140 of FIG. 4, utilizing the estimation subject job name 1401 (e.g., "Job 1") in the entry of the analysis subject schedule 150 as a key, and writes in the job net name 801.

Also, the job execution adjustment unit 110 writes the scheduled start time 1404 (e.g., "01:00") and the scheduled end time 1405 (e.g., "01:30") in the entry of the analysis subject schedule 150 in the scheduled start time 802 and the scheduled end time 803. Also, the job execution adjustment unit 110 writes the difference between the scheduled start time 1404 and the scheduled end time 1405 in the entry of the analysis subject schedule 150 in the scheduled execution period 804. Also, the job execution adjustment unit 110 writes the date stored at the status information 1408 in the entry of the analysis subject schedule 150 in the end date 805.

Also, in a case of the job schedule information 145, the job execution adjustment unit 110 writes the estimation subject job name 1401, the scheduled start time 1404, and the scheduled end time 1405 in the entry of the analysis subject schedule 150 in the 901, the 902, and the 903.

Then, the job execution adjustment unit 110 determines whether or not there is any estimation subject job that has not been selected (Step S2107), and, when there is an estimation subject job that has not been selected (Step S2107: Yes), selects the estimation subject job that has not been selected. On the other hand, when there is no estimation subject job that has not been selected (Step S2107: No), the analysis subject schedule creation process (Step S1902) ends. By this, the analysis subject schedule 150 illustrated in FIG. 14 is created.

Figure 22:
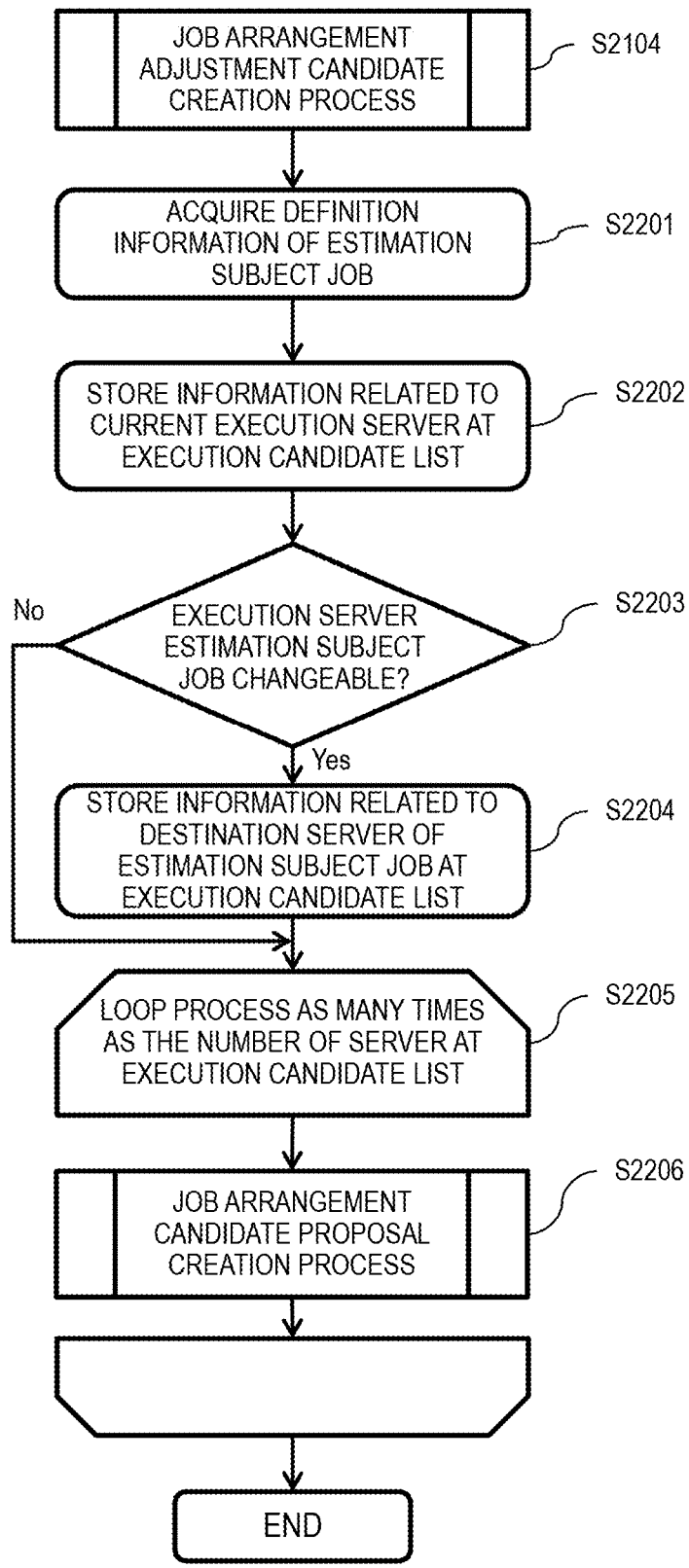
FIG. 22 is a detailed flowchart of the job arrangement adjustment candidate creation process (Step S2104) by the job arrangement adjustment unit illustrated in FIG. 21.

FIG. 22 is a detailed flowchart of the job arrangement adjustment candidate creation process (Step S2104) by the job arrangement adjustment unit 111 illustrated in FIG. 21. The job arrangement adjustment unit 111 refers to the job definition information 142 so as to acquire the definition information of the estimation subject job (Step S2201). When the estimation subject job is "Job 1," the job name of said job, which is "Job 1," and the execution agent 602, which is "AgtGrp 1", are acquired.

Next, the job arrangement adjustment unit 111 refers to the definition information of the job definition information 142 and the execution agent definition information 143 acquired in Step S2201, identifies the current execution server of the estimation subject job, and stores the same at an execution candidate list on the memory (Step S2202). To be more specific, for example, according to the example illustrated in Step S2201 where the estimation subject job is the "Job 1," the execution agent is the "AgtGrp 1." Accordingly, the job arrangement adjustment unit 111 identifies the value "SV 1" of the execution server 702 in the entry whose execution agent 701 of the execution agent definition information 143 includes "AgtGrp 1" and stores the same at the execution candidate list at the memory.

Next, the job arrangement adjustment unit 111 determines whether or not the estimation subject job is operable to change the execution server 3 (Step S2203). Note that although whether or not the job is operable to change the execution server 3 depends on the batch job management system, according embodiment 1, when the execution agent of the job includes an execution agent group rather than a single execution agent, said job is operable to be executed by any one of the execution agents included in the execution agent group.

For example, in FIG. 6, since the execution agent 602 of the "Job 1" is "AgtGrp 1" which is an execution agent group, the "Job 1" is operable to be executed by any one of the execution agents included in the "AgtGrp 1". Also, since the execution agent item of the "Job 2" includes "Agent 2", the "Job 2" is operable to be executed only at the "Agent 2". When it is determined in the determination process of Step S2203 that the execution server of the estimation subject job is changeable (Step S2203: Yes), the process proceeds to Step S2204. When it is determined that the execution server of the estimation subject job is not changeable (Step S2203: No), the process proceeds to Step S2205.

When it is determined that the execution server of the estimation subject job is changeable (Step S2203: Yes), the job arrangement adjustment unit 111 stores the job transfer destination server of the estimation subject job in the execution candidate list (Step S2204). To be more specific, for example, the job arrangement adjustment unit 111 refers to the job arrangement adjustment unit 111, the execution agent group information 141, the job definition information 142, and the execution agent definition information 143 so as to determine the execution server 702 for each execution agent 502 (701) included in the execution agent group 501 of the estimation subject job as the job transfer destination server. For example, since the execution agent group of the "Job 1" of FIG. 6 is "AgtGrp 1," "SV 10" and "SV 20" that are the execution servers of the execution agents, the "Agent 10" and the "Agent 20," included in the "AgtGrp 1" will be determined to be the job transfer destination server and stored at the execution candidate list. Also, note that the information that has already been stored at the execution candidate list in Step S2202 does not need to be stored again.

Next, the job arrangement adjustment unit 111 refers to the execution candidate list so as to loop the process of Step S2206 as many times as the number of the execution servers included in the execution candidate list (Step S2205). Next, the job arrangement adjustment unit 111 executes a job arrangement candidate proposal creation process with respect to one of the execution servers in the execution candidate list (Step S2206). The job arrangement candidate proposal creation process (Step S2206) includes a process for creating a job arrangement candidate proposal to determine a candidate of the execution server 3 which is an arrangement destination of the estimation subject job out of the execution candidate list. The details of the job arrangement candidate proposal creation process (Step S2206) will be described below with reference to FIG. 23.

Figure 23:
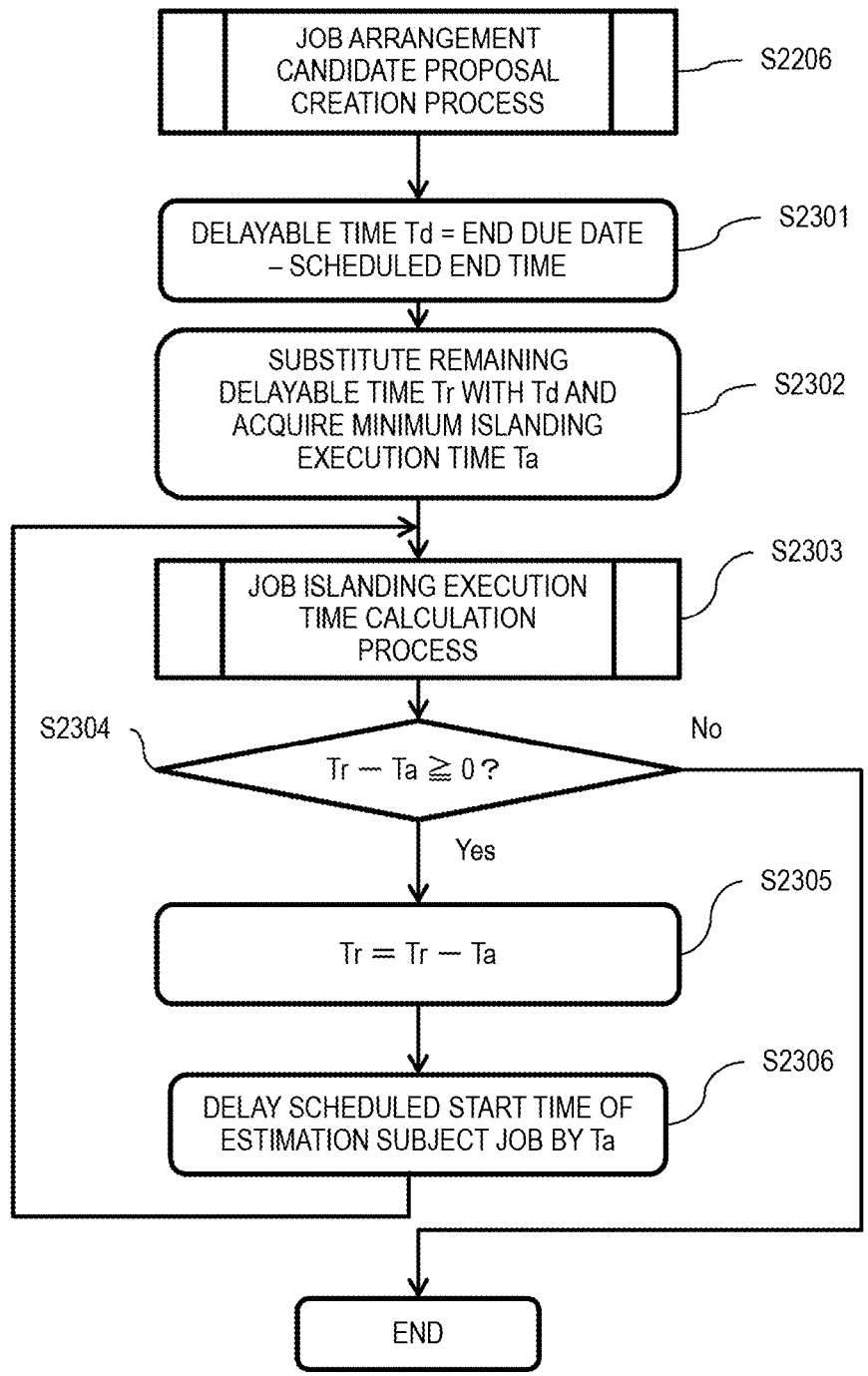
FIG. 23 is a detailed flowchart of the job arrangement candidate proposal creation process (Step S2206) illustrated in FIG. 22.

FIG. 23 is a detailed flowchart of the job arrangement candidate proposal creation process (Step S2206) illustrated in FIG. 22. The job arrangement adjustment unit 111 calculates the delayable time Td of the job net that includes the estimation subject job (Step S2301). The delayable time Td includes a maximum delayable time where an execution of a job net may be delayed. To be more specific, for example, the job arrangement adjustment unit 111 identifies the job net that includes the estimation subject job net from the job net definition information 140, and acquires the scheduled end time 803 and the end date 805 of the identified job net from the job net schedule information 144 illustrated in FIG. 8.

Then, the job arrangement adjustment unit 111 calculates the difference between the end date 805 and the scheduled end time 803 as the delayable time Td of the job net which includes the estimation subject job. According to the entry in the first row of FIG. 8, since the scheduled end time 803 of the job net "JobNet 1" includes "03:00" and the end date 805 of the same includes "03:30," the delayable time Td, which is the difference between the end date 805 and the scheduled end time 803, includes "30 minutes."

Next, the job arrangement adjustment unit 111 substitutes the delayable time Td calculated in Step S2301 for a remaining delayable time Tr. Also, the job arrangement adjustment unit 111 refers to the evaluation standard definition information 148 so as to acquire a minimum islanding execution time Ta (Step S2302). The remaining delayable time Tr includes time that remains with the delayable time Td as the maximum value. Also, the minimum islanding execution time Ta includes a minimum value of the islanding execution time IEP for the estimation subject job, which needs to be secured for conducting the configuration estimation analysis process (Step S1904), which will be described below. In other words, the remaining delayable time Tr includes the "minimum islanding execution time" of the evaluation item 1201 illustrated in FIG. 12.

In the islanding execution time IEP since only the estimation subject job operates at the execution server 3, the back end server group, where the access log of the access from the execution server 3 where the estimation subject job operates in the islanding execution time IEP is recorded, is operable to estimate the estimation subject job is a part of the job execution configuration.

Since the configuration estimation based on such access log is executed, the minimum islanding execution time Ta having a quantity that is not too short needs to be defined. The islanding execution time Ta may be defined by an administrator, or determined by the management program 200 in a mechanical manner where a predetermined ratio (e.g., 30 of execution period) of an execution period of the estimation subject job is assigned as the minimum islanding time Ta. Also, the minimum islanding execution time Ta may be determined via a method where an operation history of past jobs is taken into consideration, or by the management program 200 or a user estimating an operation pattern by referencing the operation history of other jobs.

Next, the job arrangement adjustment unit 111 calculates the islanding execution time IEP of the estimation subject job at the execution server 3 which is currently being selected during a loop process (Step S2203). The details of this job islanding execution time calculation process (Step S2303) will be described below with reference to FIG. 24.

Next, the job arrangement adjustment unit 111 determines whether or not there is an equal amount or more of the remaining delayable time Tr than the minimum islanding execution time Ta (Step S2304). When the remaining delayable time Tr is smaller than the minimum islanding execution time Ta (Step S2304: No), the process ends. On the other hand, when there is an equal amount or more of the remaining delayable time Tr than the minimum islanding execution time Ta (Step S2304: Yes), the job arrangement adjustment unit 111 subtracts the minimum islanding execution time Ta from the remaining delayable time Tr to update the value of the remaining delayable time Tr (Step S2305).

Next, the job arrangement adjustment unit 111 refers to the job net definition information 140, the job net schedule information 144, and the job schedule information 145 to create execution schedule time (scheduled end time Ta, too, is delayed) wherein the scheduled start time of the estimation subject job is delayed by the minimum islanding execution time Ta (Step S2306). At this point, when there is another job that will be executed at the same execution server after the estimation subject job is executed, the scheduled start time of the another job will be delayed as much as Ta. Then, the process returns to Step S2303 and the job arrangement adjustment unit 111 executes the job islanding execution time calculation process (Step S2303) based on the execution schedule information that is delayed by Ta. By this, where the scheduled start time of the estimation subject job is delayed, it becomes possible to create more job arrangement candidate proposals while securing the minimum islanding executing time Ta. As such, entries as many number of times as Step S2306 is executed will be created with respect to the estimation subject job. Note, however, that the number of entries created shall not exceed the maximum number of trial.

Figure 24:
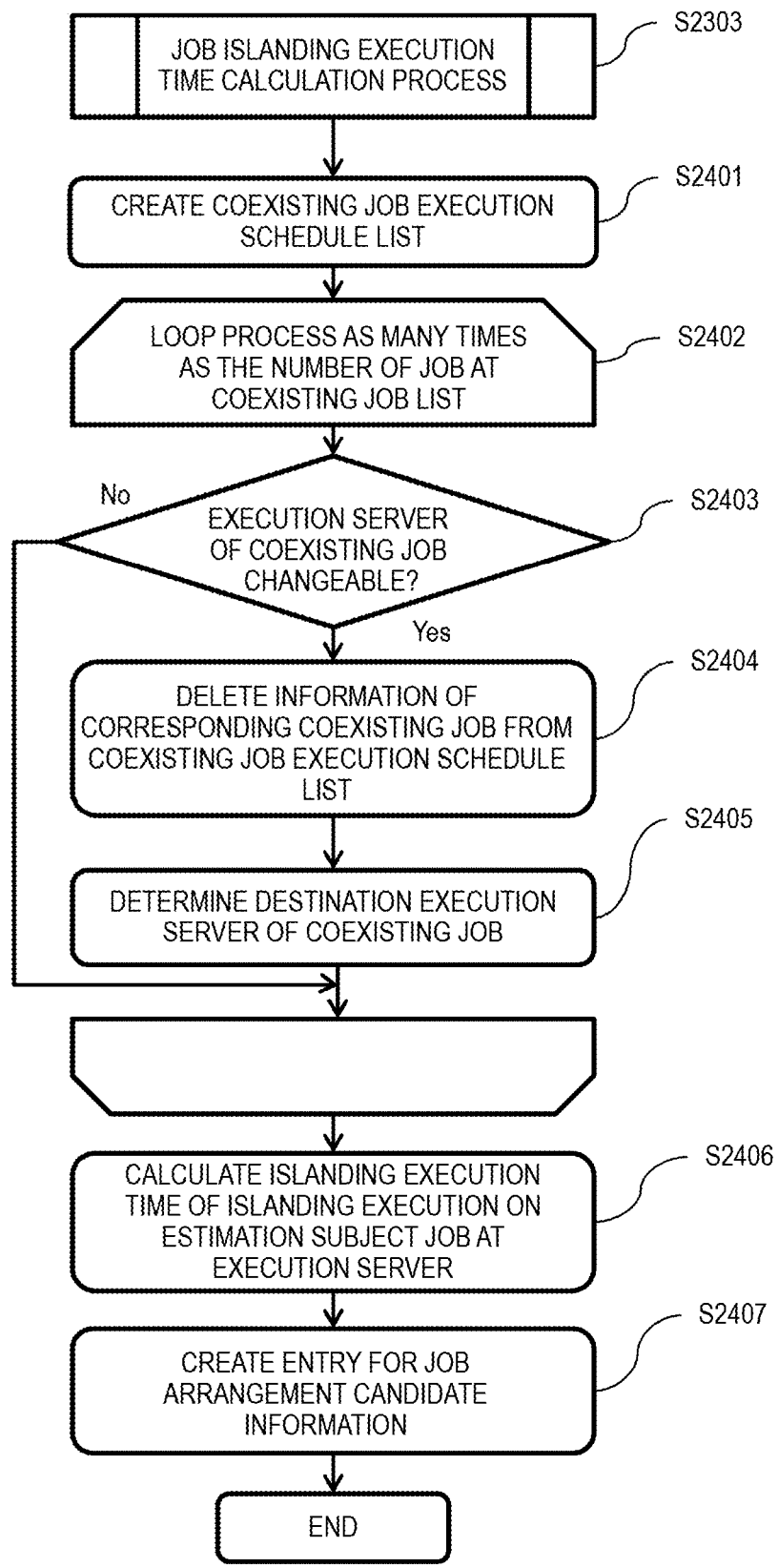
FIG. 24 is a detailed flowchart of the job islanding execution time calculation process (Step S2303) by the job arrangement adjustment unit illustrated in FIG. 23.

FIG. 24 is a detailed flowchart of the job islanding execution time calculation process (Step S2303) by the job arrangement adjustment unit 111 illustrated in FIG. 23. The job arrangement adjustment unit 111 creates a coexisting job execution schedule list (Step S2401). The coexisting job execution schedule list, which includes the information related to coexisting jobs, is stored at the memory.

The coexisting job refers to a job other than the estimation subject job that is executed at the same server as the estimation subject job during the scheduled execution period, which include a period between the scheduled start time and the scheduled end time, of the estimation subject job. According to the example in FIG. 1A (*a*), the coexisting jobs are the jobs J2 through J5 that are executed at the execution server SV1 which is where the estimation subject job J1 is executed. The job arrangement adjustment unit 111 identifies the scheduled start time and the scheduled end time of the estimation subject job from the job schedule information 145 of FIG. 9. Also, the job arrangement adjustment unit 111 identifies the execution agent that executes the estimation subject job from the job definition information 142 of FIG. 6, and identifies the execution server that corresponds to the identified execution agent from the execution agent definition information 143 of FIG. 7.

Then the job arrangement adjustment unit 111 identifies a job having the same execution server as the estimation subject job from the job definition information 142 and the execution agent definition information 143, and identifies the scheduled start time and the scheduled end time of said job from the job schedule information 145. Then, the job arrangement adjustment unit 111 determines the job having an execution period overlapping with that of the estimation subject job, and adds the same in the coexisting job execution schedule list.

Note that the information related to the coexisting job execution schedule list may include the job name, the scheduled start time, the scheduled end time, the execution agent name, and the execution server name of the coexisting job, for example.

Next, the job arrangement adjustment unit 111 loops the processes of Step S2403 through S2405 as many time as the number of the jobs included in the coexisting job execution schedule list created in Step S2401 (Step S2402), and proceeds to Step S2406 when surpassing the number of the jobs.

Next, the job arrangement adjustment unit 111 determines whether or not the execution server for the coexisting job that is currently being selected from the coexisting job execution schedule list (Step S2403). The detail description of the determination method will be omitted as it is the same as that in Step S2203. When it is determined that the execution server is changeable (Step S2403: Yes), the process proceeds to Step S2404. When it is determined that the change is not possible (Step S2403: No), the loop process proceeds to the end.

When it is determined in Step S2403 that the execution server of the coexisting job is changeable (Step S2403: Yes), the job arrangement adjustment unit 111 deletes the information related to the coexisting job from the coexisting job execution schedule list created in Step S2401 (Step S2404).

Next, the job arrangement adjustment unit 111 determines the execution server to which the coexisting job will be transferred (Step S2405). The determination method for the job transfer destination server may include a means whereby an execution server having the smallest number of jobs whose period of time for execution overlaps with that of the coexisting job is selected out of the candidates of transfer destinations. Also, as a simpler selection method, an execution server may be selected in an order in a round robin manner.

When the loop process of Step S2404 ends, the job arrangement adjustment unit 111 calculates the period in which the estimation subject job is executed at the execution server individually (islanding execution time IEP) based on the execution schedule time of the estimation subject job and the coexisting job execution schedule list (Step S2406). To be more specific, for example, the job arrangement adjustment unit 111 calculates a remaining duration, which is obtained from excluding the schedule execution period of the coexisting job from the scheduled execution period, which includes a period between the scheduled start time and the scheduled end time, of the estimation subject job, as the islanding execution time IEP.

Finally, the job arrangement adjustment unit 111 determines whether or not the islanding execution time IEP calculated in Step S2406 is equal to or greater than the minimum islanding execution time Ta, and, when it is determined the islanding execution time IEP calculated in Step S2406 is equal to or greater than the minimum islanding execution time Ta, creates an entry of the job arrangement candidate information 149 with respect to the estimation subject job (Step S2407). Also, since the islanding execution time IEP of the estimation subject job will be used in the configuration estimation analysis process (Step S1904), which will be described below, the job arrangement adjustment unit 111 saves the islanding execution time IEP of the estimation subject job at the estimation process period 1406 in the entry of the estimation subject job in the analysis subject schedule 150.

Figure 25:
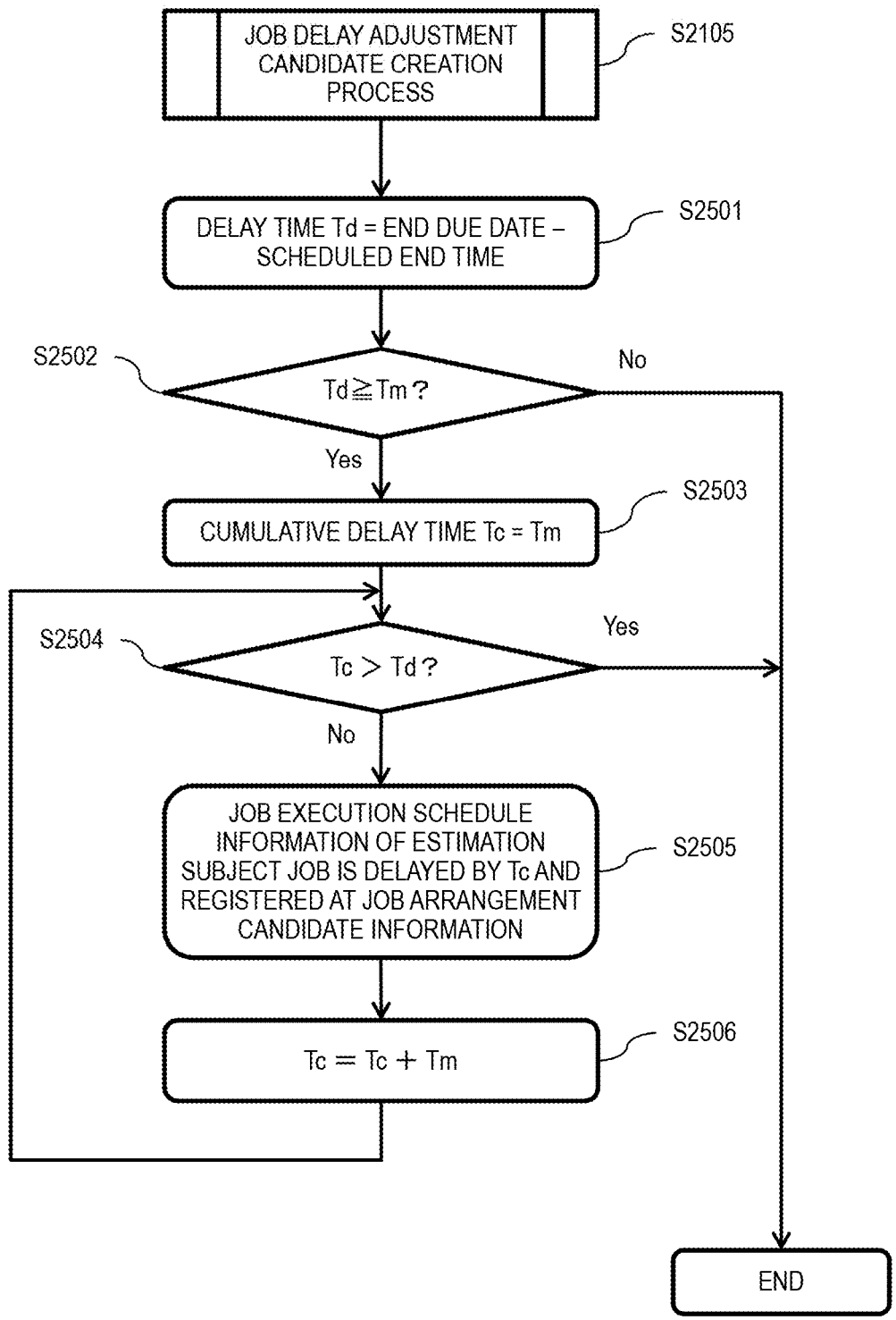
FIG. 25 is a detailed flowchart of the job delay adjustment candidate creation process (Step S2105) by the job delay adjustment unit.

FIG. 25 is a detailed flowchart of the job delay adjustment candidate creation process (Step S2105) by the job delay adjustment unit 112. The job delay adjustment unit 112 calculates in the same manner as in Step S2301 the delayable time Td with respect to the job net which include the estimation subject job (Step S2501).

Next, the job delay adjustment unit 112 refers to the evaluation standard definition information 148 and acquires a minimum delay time Tm so as to determine whether or not the value of the delayable time Td is equal to or greater than the minimum delay time Tm (Step S2502). Here, the minimum delay time Tm indicates the delay time of the estimation subject job which needs to be secured for conducting the configuration estimation analysis process (Step S1904), which will be described below. By delaying the execution time of the estimation subject job, when there is a back end server group displaying a tendency different from regular job processing load as illustrated in FIG. 1B, it becomes possible, by comparing the delay time and a load change time of the estimation subject job, to estimate the back end server is a part of the job execution configuration of the estimation subject job.

Since the configuration estimation based on such load change is executed, the minimum delay time Tm having a quantity that is not too short needs to be defined. The minimum delay time Tm may be defined by an administrator, or by the management program 200 in a mechanical manner where a predetermined ratio (e.g., 30% of execution period) of the execution period of the estimation subject job is assigned as the minimum delay time Tm. Also, the minimum delay time Tm may be determined via a method where an operation history of past jobs or an operation pattern based on the operation history of other jobs. When the value of the delayable time Td is equal to or greater than the minimum delay time Tm (Step S2502: Yes), the process proceeds to Step S2503.

Next, the job delay adjustment unit 112 substitutes the minimum delay time Tm for a cumulative delay time Tc (Step S2503).

Next, the job delay adjustment unit 112 determines whether or not the cumulative delay time Tc is greater than the delayable time Td (Step S2504). When the cumulative delay time Tc is equal to or smaller than the delayable time Td (Step S2504: No), the process proceeds to Step S2505. When the cumulative delay time Tc is greater than the delayable time Td (Step S2504: Yes), the job delay adjustment candidate creation process (Step S2105) ends.

Next, the job delay adjustment unit 112 refers to the job net definition information 140, the job net schedule information 144, and the job schedule information 145 so as to save the execution schedule information in which the scheduled start time of the estimation subject job is delayed as much as the cumulative delay time Tc at the job arrangement candidate information 149 (Step S2505). When adjusting delays, the execution schedule information is configured to include the estimation subject job name 1301 and the execution server 1302, while the islanding execution time 1303, the coexisting job name 1304, or the transfer job information 1305 will be unnecessary. This execution schedule information is saved by the job delay adjustment unit 112 at the estimation process period 1406 in the entry of the estimation subject job at the analysis subject schedule 150 as the execution schedule information concerning to what extent the execution of the estimation subject job is delayed will be used in the configuration estimation analysis process, which will be described below.

Next, the job delay adjustment unit 112 updates the cumulative delay time Tc by adding the minimum delay time Tm to the cumulative delay time Tc (Step S2506), and returns to Step S2504. In Step S2105, when the delayable time Td is smaller than the minimum delay time Tm (Step S2502: No), the job delay adjustment candidate creation process (Step S2105) ends. As such, entries as many number of times as Step S2505 is executed will be created with respect to the estimation subject job. Note, however, that the number of entries created shall not exceed the maximum number of trial.

Figure 26:
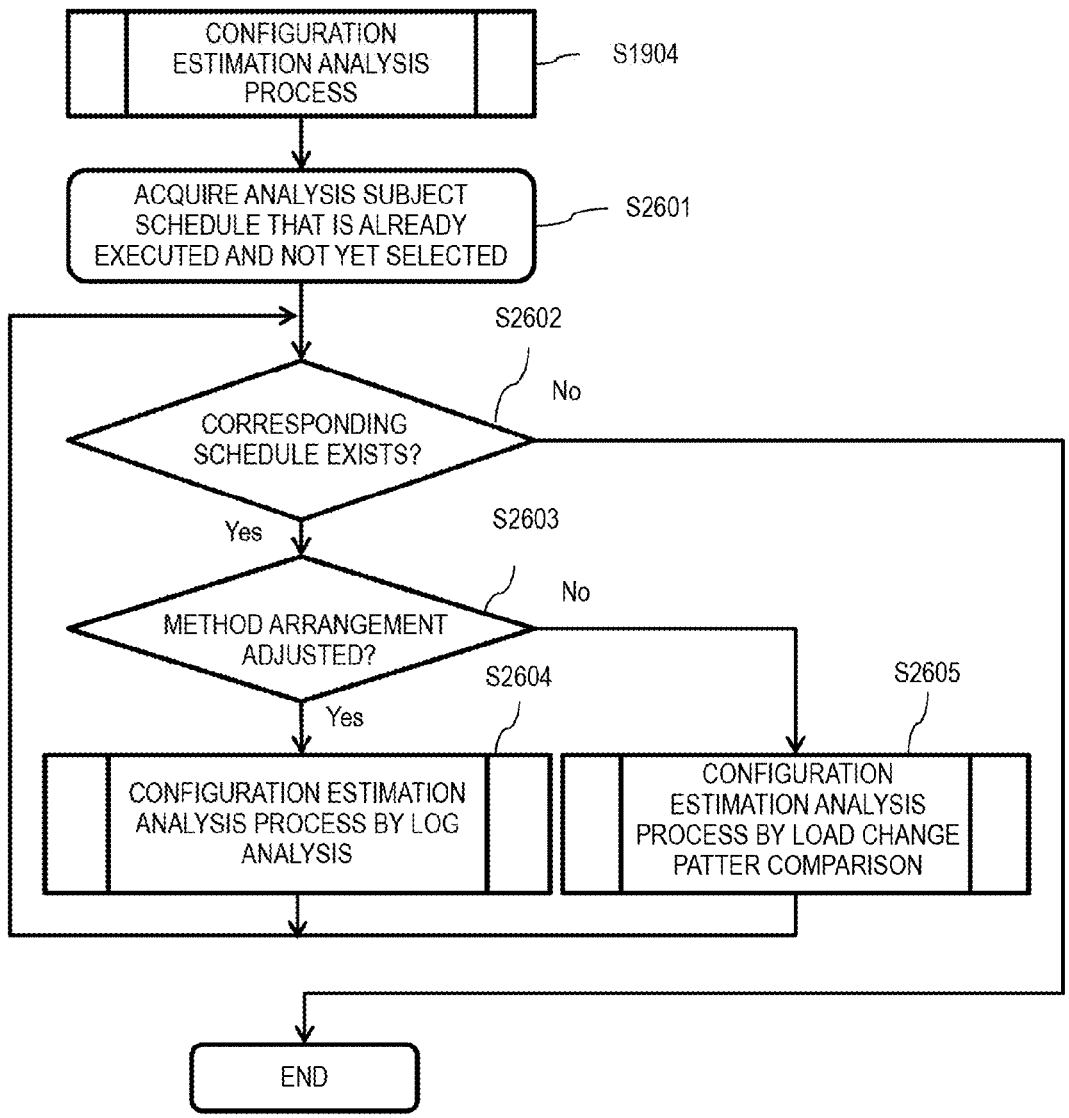
FIG. 26 is a detailed flowchart of the configuration estimation analysis process (Step S1904) by the configuration estimation analysis process unit.

FIG. 26 is a detailed flowchart of the configuration estimation analysis process (Step S1904) by the configuration estimation analysis process unit 120. The configuration estimation analysis process unit 120 refers to the status information 1408 of the analysis subject schedule 150 so as to acquire the schedule indicated by the entry in which the status information 1408 includes "executed" (Step S2601).

With respect to the status information 1408, when a job is executed in accordance with the schedule indicated in the entry, the management program 200 updates the status information 1408 of the schedule in which an execution of a job is finished from "execution registration" to "executed." The configuration estimation analysis process unit 120 acquires the schedule in which the status information 1408 is updated to "executed." Also, when there is more than one such schedule, the configuration estimation analysis process unit 120 acquires the schedule having the oldest execution schedule date in the status information 1408.

Next, the configuration estimation analysis process unit 120 determines whether or not there is a corresponding schedule in Step S2601 (Step S2602). When there is a corresponding schedule, the configuration estimation analysis process unit 120 proceeds to the process in Step S2603. When there is no corresponding schedule (Step S2602: No), the configuration estimation analysis process unit 120 ends the configuration estimation analysis process (Step S1904).

Next, the configuration estimation analysis process unit 120 refers to the configuration estimation method 1407 of the schedule acquired in Step S2601 so as to determine whether or not the configuration estimation method 1407 includes arrangement adjustment. When the configuration estimation method 1407 includes arrangement adjustment (Step S2603: Yes), the configuration estimation analysis process unit 120 proceeds to Step S2604. When the configuration estimation method 1407 does not include arrangement adjustment, that is, the configuration estimation method 1407 includes delay adjustment (Step S2603: No), the configuration estimation analysis process unit 120 proceeds to Step S2605.

Next, when the configuration estimation method 1407 includes arrangement adjustment (Step S2603: Yes), the configuration estimation analysis process unit 120 calls the log analysis unit 121 to have the configuration estimation analysis process executed by log analysis (Step S2604). The configuration estimation analysis process by log analysis (Step S2604), to be more specific, includes a process illustrated in FIG. 1A (*b*). This enables the log analysis unit 121 to identify the job that accessed from the execution server during the islanding execution time IEP. Note that the details of the configuration estimation analysis process by log analysis (Step S2604) will be described below with reference to FIG. 27.

Also, when the configuration estimation method 1407 includes delay adjustment (Step S2603: No), the configuration estimation analysis process unit 120 calls the load analysis unit 122 to have the configuration estimation analysis process executed by load change pattern comparison (Step S2605). The configuration estimation analysis process by load change pattern comparison (Step S2605), to be more specific, includes a process illustrated in FIG. 1B (*b*), for example. This enables the load analysis unit 122 to identify the back end server that displays a load change waveform different from that showing a regular load, and the job that gave the cause of the delay. Note that the details of the configuration estimation analysis process by load change pattern comparison (Step S2605) will be described below with reference to FIG. 28.

The configuration estimation analysis process unit 120 returns to Step S2602 after the configuration estimation analysis process of Step S2604 or Step S2605, and, when there is no schedule that has not be selected (Step S2602: No), ends the configuration estimation analysis process (Step S1904).

Figure 27:
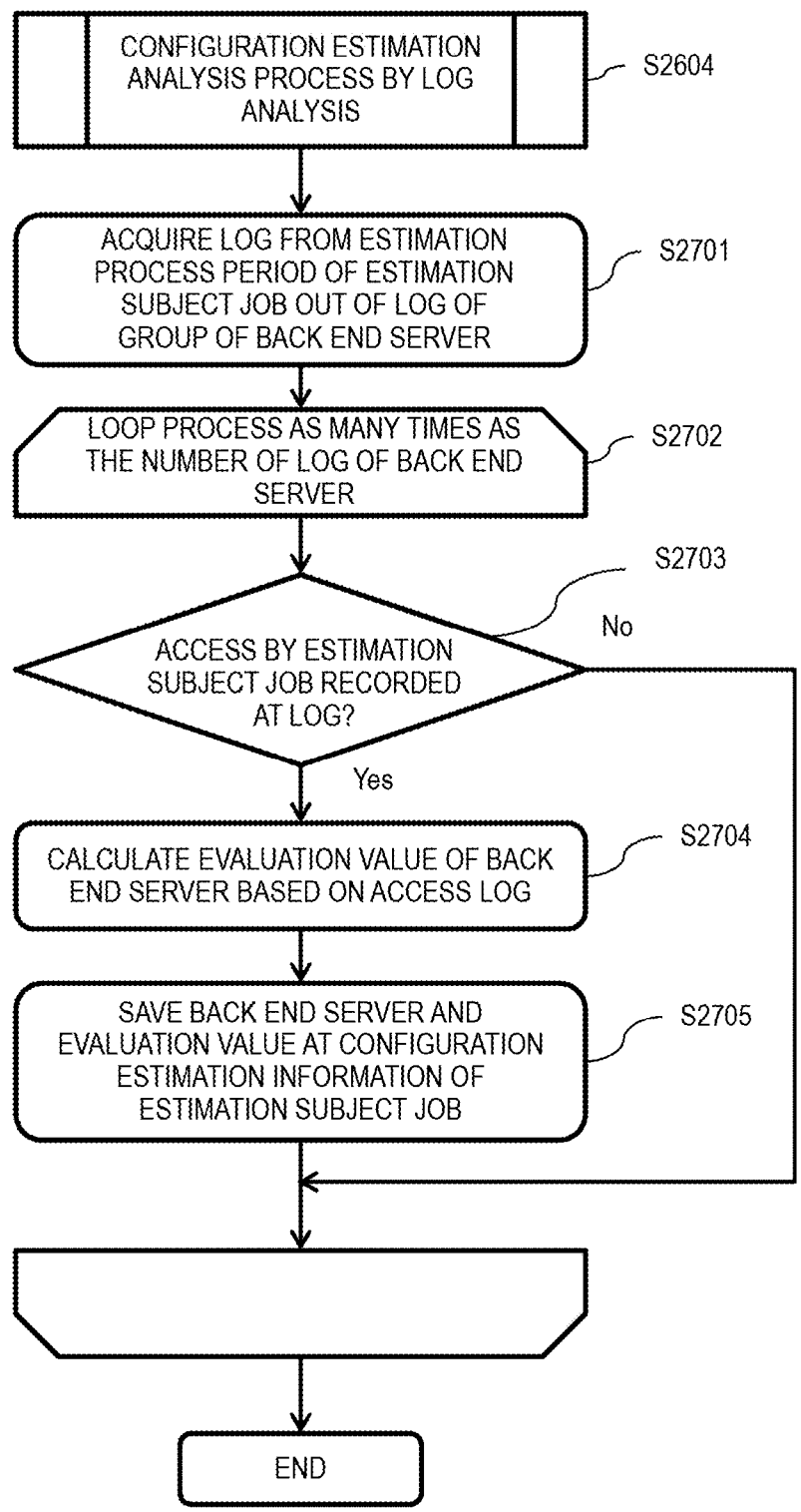
FIG. 27 is a detailed flowchart of the configuration estimation analysis process by log analysis (Step S2604) illustrated in FIG. 26.

FIG. 27 is a detailed flowchart of the configuration estimation analysis process by log analysis (Step S2604) illustrated in FIG. 26. The log analysis unit 121 acquires a log that is in the estimation process period 1406 of the estimation subject job name 1401 out of the log in the back end server group (Step S2701). To be more specific, for example, the log analysis unit 121 refers to the log acquisition means information 151 and accesses where the log of the back end server group, which is indicated by the log pass 1503, is saved so as to acquire a log that is in the estimation process period 1406 of the estimation subject job name 1401.

Next, the log analysis unit 121 takes out one acquired log at a time from the back end server group, and loops the processes of Step 2703 through Step S2705 as many times as the number of the log (Step S2702). Note that the log that has been processed by the loop will be referred to as "subject log". Then, the log analysis unit 121 ends the configuration estimation analysis process by log analysis (Step S2604) when there is no more acquired log.

Next, the log analysis unit 121 refers to the analysis subject schedule 150 so as to determine whether or not an access from the execution server 1403 of the estimation subject job name 1401 is recorded at the subject log (Step S2703). When the access from the execution server is recorded at the subject log (Step S2703: Yes), the log analysis unit 121 proceeds to Step S2704. When not recorded (Step S2703: No), the log analysis unit 121 proceeds to the last portion of the loop process.

Next, the log analysis unit 121 calculates an evaluation value of the back end server 4 based on the subject log determined in Step S2703 (Step S2704). Here, the evaluation value of the back end server 4 includes a value that indicates the degree of reliability as to whether or not the back end server 4 is included as a part of the job execution configuration of the estimation subject job. A method to calculate the evaluation value may be defined in advance in the evaluation standard definition information 148 by an administrator.

An example of the evaluation standard may include a calculation where the larger the number of log writings per unit time the higher the evaluation value. Also, the evaluation value may be calculated such that the larger the total number of times of appearances of access from the execution server 3 in an execution time of the estimation subject job the higher the evaluation value. Also, when the processing characteristics of the estimation subject job are known, the evaluation value may be calculated based on a tendency of log appearance in a specified period within a job execution time. For example, when the number of times of appearance is used as the log appearance tendency in a specified period of time, the evaluation value may be calculated in a manner the higher the total number of appearance of access from the execution server 3 in a specified period of time of the estimation subject job is the higher the evaluation becomes.

Also, utilizing the log at the execution server 3 enables the log analysis unit 121 to calculate the evaluation value based on the relationship between the processing time at the log of the execution server 3 and the temporal order of the processing time at the log of the execution server 4. For example, after the execution server 3 executes the process to request data, it may be calculated that the degree of reliability of the both servers 3 and 4 configuring the job execution is high when the processes to transmit data to the execution server 3 by the back end server 4 is recorded in the log one following the other. Also, the evaluation value may be converted to an index value (e.g., "high," "mid," and "low") that expresses the level of the reliability in order to combine it with an evaluation value that is calculated in the details of the configuration estimation analysis process by load change pattern comparison (Step S2605), which will be described below.

Then, the log analysis unit 121 saves the information related to the back end server 4 from which the subject log is acquired and the evaluation value calculated in Step S2704 at the configuration estimation information 152 illustrated in FIG. 16. Note that the information related to the back end server 4 from which the subject log is acquired includes the information that is operable to identify the back end server 4, such as the server name 1501. The information that is saved in Step S2705 includes the information that is displayed as an analysis result in Step S1905 of FIG. 19. Then, the process returns to the beginning of the loop process.

Figure 28:
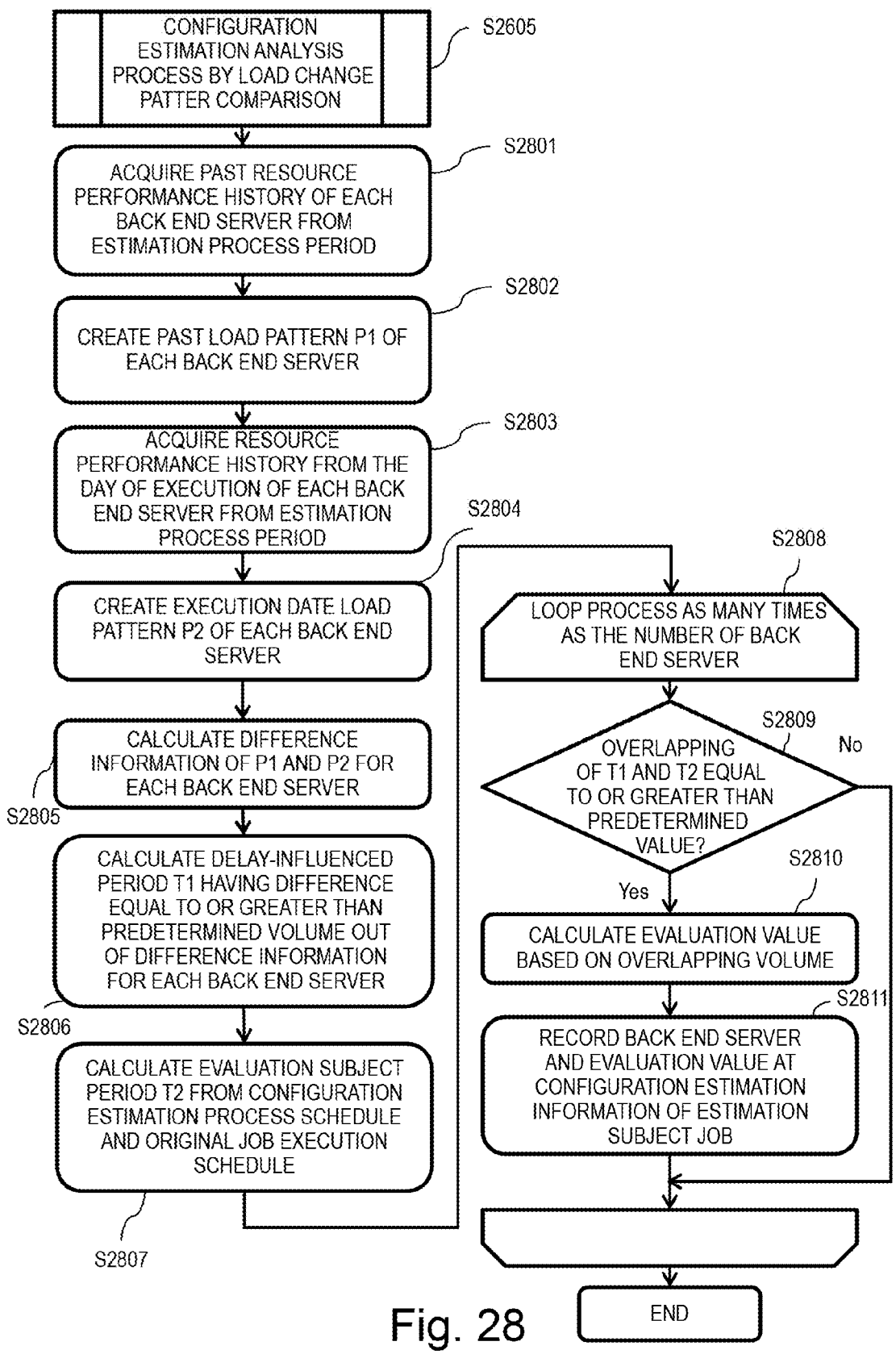
FIG. 28 is a detailed flowchart of the configuration estimation analysis process by load change pattern comparison (Step S2605).

FIG. 28 is a detailed flowchart of the configuration estimation analysis process by load change pattern comparison (Step S2605). The load analysis unit 122 identifies the back end server 4 that received an access from the estimation subject job name 1401 in the estimation process period 1406 of the estimation subject job name 1401, and acquires the resource performance history information 153 of the back end server 4 (Step S2801). Note that the volume to be acquired here only requires enough to create the past load change pattern P1 in the process that follows in Step S2802. For example, the load analysis unit 122 acquires an entry in which the acquisition date and time 1701 includes the past one week from the resource performance history information 153.

Next, the load analysis unit 122 creates a past load change pattern P1 for each back end server 4 based on the entry of the resource performance history information 153 acquired in Step S2801 (Step S2802). A method to create the past load change pattern P1 may include calculating an average value for each of the resource information 1702 through 1704 for each period of time (e.g., 1 hour) of acquiring from the resource performance history information 153 so as to calculate the past load change pattern for one day for the resource information 1702 through 1704. Note that the past load change pattern P1 for one day for any of the resource information, rather than for the resource information 1702 through 1704, may be calculated. This applies to the following steps as well.

Next, the load analysis unit 122 acquires an entry which indicates the resource performance history of the back end server 4 on the execution date in the estimation process period 1406 from the acquired entry in the resource performance history information 153 (Step S2803). Here, what is meant by the "execution date" includes the date and time registered in the status information 1408 when the status information 1408 of the analysis subject schedule 150 indicates "executed."

Next, the load analysis unit 122 creates the load change pattern P2 for the execution date in which the estimation subject job is executed by delay adjustment per resource information 1702 through 1704 based on the entry indicating the resource performance history acquired in Step S2803 for each back end server 4 (Step S2804). A method to create the load change pattern P2 on the execution date may include a method same as that in Step S2802, for example.

Next, the load analysis unit 122 calculates per resource information 1702 through 1704 the difference between the past load change pattern P1 created in Step S2802 and the load change pattern P2 on the execution date created in Step S2804 in the estimation process period 1406 for each back end server 4 (Step S2805). To be more specific, for example, the load analysis unit 122 may be able to calculate by acquiring a value for the difference at the same time in the estimation process period 1406 between the past load change pattern P1 and the load change pattern P2 on the execution date for the same resource type (e.g., CPU use rate).

Next, the load analysis unit 122 calculates a time period where the difference calculated in Step S2805 is equal to or greater than a predetermined volume as a delay-influenced period T1 per resource information 1702 through 1704 for each back end server 4 (Step S2806). Note that the evaluation standard for the value of the difference may be defined in advance in the evaluation standard definition information 148 by an administrator, and, according to the example in FIG. 12, it will be determined that the difference is greater than a predetermined value when the CPU use rate, which is used for the difference evaluation, is equal to or greater than 30%.

Next, the load analysis unit 122 calculates a period between the execution start time ts1 of the past load change pattern P1 and the execution end time te2 of the load change pattern P2 on the execution date as the evaluation subject period T2 as illustrated in FIG. 18 (Step S2807).

Next, the load analysis unit 122 selects one back end server 4 after another acquired in Step S2801 and loops the processes of Step S2809 through S2811 as many times as the number of the back end server 4 (Step S2809). Note that the back end server 4 that will be processed in the loop will be referred to as "subject back end server." Then, the log analysis unit 121 ends the configuration estimation analysis process by load change pattern comparison (Step S2605) when there is no more subject back end server.

Next, the load analysis unit 122 determines whether or not the ratio (overlap value) of the delay-influenced period T1 calculated in Step S2806 overlapping with the evaluation subject period T2 calculated in Step S2807 is equal to or greater than a predetermined value (Step S2809). That is, the load analysis unit 122 makes a determination as to whether or not T1/T2 is equal to or greater than the predetermined value. Note that the evaluation standard for the value of the predetermined value may be defined in advance in the evaluation standard definition information 148 by an administrator, and, according to the example in FIG. 12, it will be determined that the T1 and T2 overlap to be equal to or greater than the predetermined value when the "overlap value" is equal to or greater than 80%.

When it is determined the overlap value is equal to or greater than the predetermined value (Step S2809: Yes), the load analysis unit 122 proceeds to the process of Step S2810. When it is determined the overlap value is smaller than the predetermined value (Step S2809: No), the load analysis unit 122 proceeds to the last portion of the loop process.

Next, the load analysis unit 122 calculates an evaluation value of the subject back end server based on the overlap value calculated in Step S2809 (Step S2810). Here, the significance of the evaluation value is the same as that which is described in S2704. It may be determined that the greater the overlap value is, the greater the change in the processing load of the subject back end server, which allows it to be evaluated that it is highly likely that the subject back end server is included as a part of the job execution configuration of the estimation subject job. Note that the evaluation value may include the overlap value as is, or be converted to an index value (e.g., "high," "mid," and "low") that expresses the level of the reliability in order to combine it with the evaluation value of Step S2703.

Then, the load analysis unit 122 saves the information related to the subject back end server and the evaluation value calculated in Step S2810 at the configuration estimation information 152 illustrated in FIG. 16 (Step S2811). Note that the information related to the subject back end server includes the information that is operable to identify the subject back end server, such as the server name 1501. The information that is saved in Step S2705 includes the information that is displayed as an analysis result in Step S1905 of FIG. 19. Then, the process returns to the beginning of the loop process.

As described above, according to embodiment 1, the management server 1 is operable to estimate the job execution configuration where which particular job and from which execution server 3 an access was made to the back end server 4 as well as to which back end server 4 said access was made. Accordingly when a job designer and a developer of a program used when executing the job are not the same, or when a job goes through a minor version change due to a long term use of the job, the management server 1 is operable to estimate the job execution configuration.

Embodiment 2

Next, an embodiment 2 will be described with reference to FIG. 29 and FIG. 30. Embodiment 2 includes an implemental method which allows an estimation analysis of a job execution configuration to be completed before a performance issue of a job occurs, wherein creating of the analysis subject schedule 150 illustrated in FIG. 14 and the configuration estimation analysis process (Step S1904) illustrated in FIG. 19 as explained in embodiment 1 are implemented by the management program 200 in the background at fixed intervals to all jobs. By this, where the configuration estimation analysis process (Step S1904) is implemented in an orderly manner to each job while jobs are being implemented, it becomes possible to construct in advance the estimation information of the job execution configuration before a performance issue occurs. Note that contents in embodiment 2 that are the same as those in embodiment 1 will be assigned with the same reference numerals and the description thereof will be omitted.

FIG. 29 is an explanatory diagram illustrating an example of the memory contents of estimation subject job management information. The estimation subject job management information 154 includes the information that defines whether or not the configuration estimation analysis process (Step S1904) illustrated in FIG. 19 is already executed for each job. The estimation subject job management information 154 is accessed by the configuration estimation analysis process unit 120.

The estimation subject job management information 154 includes a job name 2901, an execution status 2902, and an execution date 2903. The job name 2901 is registered in advance. The execution status 2902, whose default status includes "not yet executed," will be updated from the "not yet executed" to "executed" by the configuration estimation analysis process unit 120 after the configuration estimation analysis process (Step S1904) is executed. The execution date 2903 stores therein the date in which the job designated by the job name 2901 is executed. That is, the entry in the first row shows that Job 1 was executed on Feb. 12, 2014.

Also, the estimation subject job management information 154 refers to the execution date 1803 for each job at the estimation subject job management information 154 so as to update the execution status 1802 of the job whose difference between the current date and the execution date is equal to or greater than a predetermined value from "executed" to "not yet executed" in order to review the execution configuration of the job after a certain time period has passed since the configuration estimation analysis process (Step S1904) was executed thereto. The difference concerning the execution date may be defined in advance and stored at the evaluation standard definition information 148 by an administrator, or saved as a fixed value (e.g., 1 month) as the internal information of the management program 200.

Figure 30:
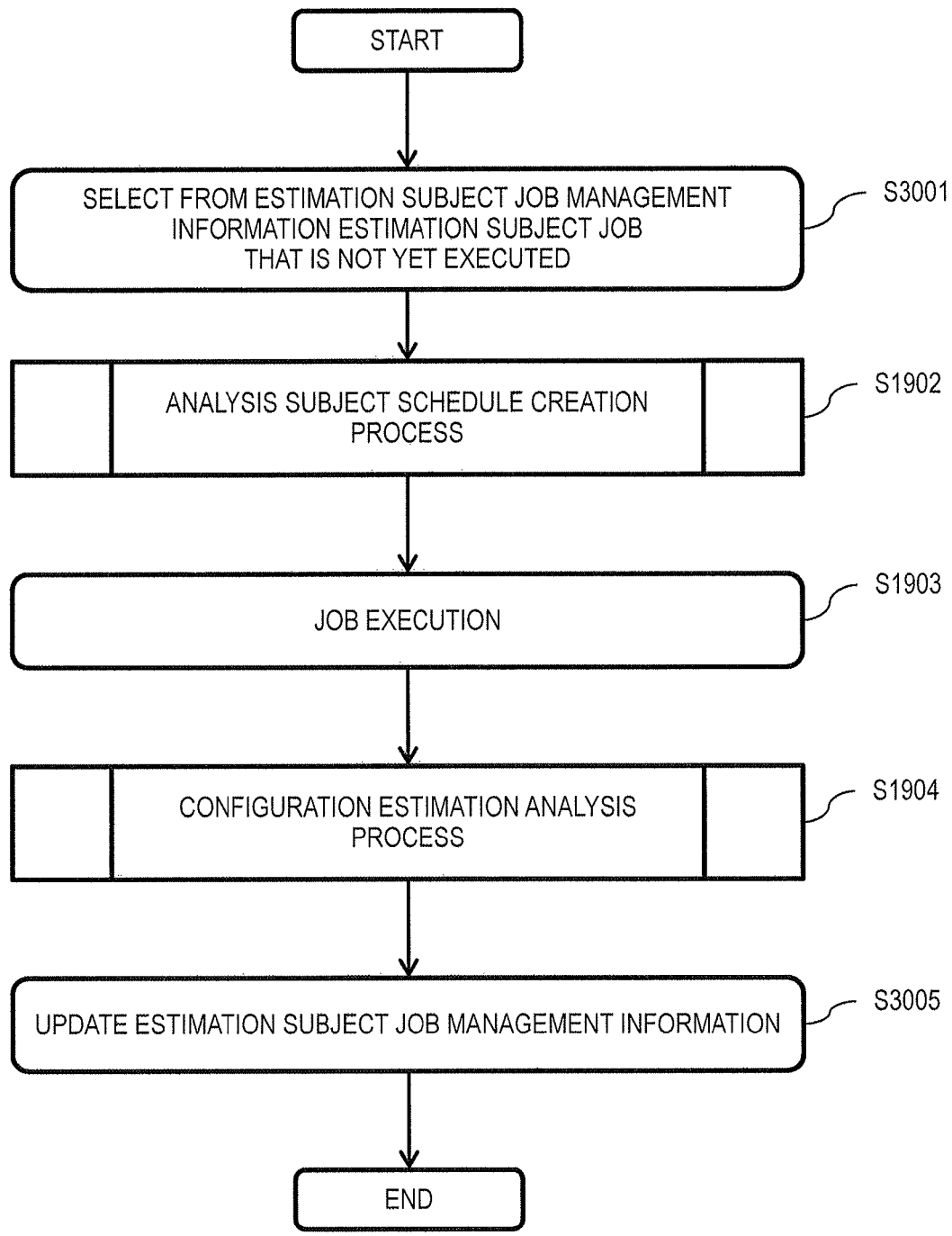
FIG. 30 is a flowchart illustrating an entire procedure of the management program according to embodiment 2.

FIG. 30 is a flowchart illustrating an entire procedure of the management program 200 according to embodiment 2. The management program 200 refers to the estimation subject job management information 154 so as to select one job for which the configuration estimation analysis process (Step S1904) has not yet been executed as an estimation subject job (Step S3001). According to the example in FIG. 30, the management program 200 refers to the execution status 2902 and selects "Job 2" whose execution status 2902 is "not yet executed."

Next, the management program 200 executes the analysis subject schedule creation process to the estimation subject job which was selected in Step S3001 (Step S1902). The analysis subject schedule creation process (Step S1902), whose basic contents include the same as those explained for embodiment 1, will be described solely for the difference from embodiment 1.

Firstly, since the reception of a user input is unnecessary for the acquisition of the maximum trial number information (Step S2101) of FIG. 21, the trial number will be saved as the internal information of the management program 200 and read out as many time as the number of trials.

Secondly, since the estimation subject job has already been acquired in the process of Step S3001, the acquisition of the estimation subject job (Step S2102) is unnecessary.

Thirdly, with respect to the job arrangement adjustment candidate creation process (Step S2104) the job arrangement candidate proposal creation process (Step S2206) for creating a different execution pattern delaying the start time of the estimation subject job is executed, but an adjust may be made to the condition for delaying the start time in consideration of the following point. That is, since the configuration estimation analysis process (Step S1904) is executed in the background in embodiment 2, in order to minimize the influence on the job currently in operation, the process to delay the job start time (Step S2304 through Step S2306) may be skipped so as to use only the current job start time.

For example, there are occasion in which when the configuration estimation analysis process (Step S1904) is executed in the background with respect to the estimation subject job "Job 1", after the execution of the job arrangement adjustment candidate creation process (Step S2104), the job arrangement adjustment candidate creation process (Step S2104) is executed with respect to the estimation subject job "Job 2". In such case, in the job arrangement adjustment candidate creation process (Step S2104) of the estimation subject job "Job 2", the process to delay the job start time (Step S2304 through Step S2306) is skipped. In the similar manner, in consideration of the influence on the current job, the job delay adjustment candidate creation process (Step S2105) may be skipped.

Next, the management program 200 executes the job that is scheduled (Step S1903) and the configuration estimation analysis process (Step S1904). Since these process contents are the same as those for embodiment 1, the detailed description thereof will be omitted.

Next, the management program 200 updates the estimation subject job management information 154 (Step S3005). To be more specific, for example, the management program 200 updates the execution status 1802 of the estimation subject job management information 154 with respect to the job to which the configuration estimation analysis process (Step S1904) is executed as "executed". Further, the management program 200 refers to the execution date 1803 for each job at the estimation subject job management information 154 so as to update the execution status 1802 of the job whose difference between the current date and the execution date is equal to or greater than a predetermined value to "not yet executed" in order to review the execution configuration of the job after a certain time period has passed since the configuration estimation analysis process (Step S1904) was executed thereto.

The difference concerning the execution date may be defined in advance and stored at the evaluation standard definition information 148 by an administrator, or saved as a fixed value (e.g., 1 month) as the internal information of the management program 200. As such, since the configuration estimation analysis process (Step S1904) is executed in an orderly manner to each job in operation, the management server 1 becomes operable to construct the analysis subject schedule 150 which includes the estimation information of the job execution configuration in advance before the occurrence of a performance issue.

As described above, according to the present embodiment, the management server 1 will be operable to improve the accuracy in identifying the estimation subject job without halting job schedule by intentionally creating the islanding execution time IEP in which only the estimation subject job out of multiple jobs at the execution server 3 is executed individually. Also, since there is no need to stop job schedule, the management server 1 is enabled to identify the job execution configuration in an effective manner.

Also, by having another job which operates at the same execution server 3 as the estimation subject job and whose execution period overlaps with that of the estimation subject job operate at another execution server 3, the management server 1 is operable to secure the islanding execution time IEP for the estimation subject job. In particular, this is useful when the estimation subject job is not operable to be executed at another execution server 3. Also, when it is impossible to have another job be executed at another execution server 3, the flexibility in creating the islanding executing time IEP is improved.

Also, when creating the islanding execution time IEP, by changing the execution period of the estimation subject job to an extent to which the execution period of the estimation subject job may be delayed, the management server 1 is operable to create multiple islanding execution times IEP, whereby the flexibility in creating the islanding execution time IEP is improved.

Also, by calculating the evaluation value, which indicates whether an access is from the estimation subject job, based on the log of the back end server 4 in the islanding execution time IEP, the management server 1 is operable to provide a user with an index value operable to identify the back end server 4 having received an access from the estimation subject job in a stochastic manner. Accordingly, such user is operable to refer to the evaluation value so as to estimate the execution configuration indicating which job it was that accessed the back end server 4 that includes the destination of the access by the execution server 3.

Note that when transferring a job, since the job start time of the job that will be transferred does not change, the management server 1 is operable to minimize the influence such as the execution of the job being delayed. By using the implementation method, among these implementation methods, that allows the maximum length for the islanding execution time IEP, it becomes possible to improve the accuracy in identifying the job execution configuration.

Also, by intentionally making a delay adjustment to the execution period of the estimation subject job at the execution server 3, the management server 1 is operable to improve the accuracy in identifying the execution configuration with respect to the estimation subject job without halting job schedule. Also, since there is no need to halt job schedule, the management server 1 is operable to identify job execution configuration effectively.

Also, the past load change pattern P1 of the back end server 4 which received an access from the estimation subject job and the load change pattern P2 of the same back end server 4 when it is delayed are obtained. By comparing the pattern P1 with pattern P2, the management server 1 calculates the evaluation value which indicates the access to the back end server 4 was made by the estimation subject job. By this, the management server 1 is operable to provide a user with an index value configured to identify the back end server 4 having received an access from the estimation subject job in a stochastic manner. Accordingly, such user is operable to refer to the evaluation value so as to estimate the execution configuration indicating which job it was that accessed the back end server 4 that includes the destination of the access by the execution server 3.

Also, when making a delay adjustment of the execution period of the estimation subject job, by changing the execution period of the estimation subject job to an extent to which the execution period of the estimation subject job may be delayed, the management server 1 is operable to create multiple load change patterns P2, whereby the flexibility in creating the load change pattern P2 is improved.

By comparing the pattern P1 with pattern P2 so as to calculate the evaluation value which indicates an access was made by the estimation subject job, the management server 1 is operable to provide a user with an index value configured to identify the back end server having received the access from the estimation subject job in a stochastic manner. Accordingly, such user is operable to refer to the evaluation value so as to estimate the execution configuration indicating which job it was that accessed the back end server 4 that includes the destination of the access by the execution server 3.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A job scheduling apparatus comprising:
a memory;
a communication interface communicatively coupled to a plurality of execution computers and a plurality of backend computers, wherein the plurality of execution computers includes a first execution computer; and
a processor communicatively coupled to the memory and the communication interface, wherein the processor improves accuracy in identifying an execution configuration of a plurality of jobs that are scheduled to be executed by the plurality of execution computers by:
identifying an estimation subject job from a plurality of jobs that are scheduled to be executed by the first execution computer, wherein the estimation subject job has a scheduled execution period overlapping with a scheduled execution period of one or more other jobs from the plurality of jobs that are scheduled to be executed by the first execution computer and the estimation subject job includes processing that is performed on a particular backend computer from the plurality of backend computers;
calculating an islanding execution time, wherein the island execution time is a time when the estimation subject job is executing individually on the first execution computer, and the one or more other jobs are not being executed;
acquiring a log from the particular backend computer, wherein the log includes information recorded by the particular backend computer when the estimation subject job was processed by the particular backend computer;
calculating an evaluation value based on the islanding execution time;
determining a degree of accuracy value by comparing the islanding execution time with the information recorded by the particular backend computer when the estimation subject job was processed by the particular backend computer; and
scheduling execution of the plurality of jobs on the plurality of execution computers based on the evaluation value and the degree of accuracy value.

2. The job scheduling apparatus according to claim 1,
wherein the plurality of execution computers further includes a second execution computer; and
wherein the processor further improves the accuracy in identifying the execution configuration of the plurality of jobs by:
reassigning the scheduled execution of the one or more other jobs to the second execution computer, and
calculating the islanding execution time after the one or more other jobs have been reassigned.

3. The job scheduling apparatus according to claim 1,
wherein the processor further improves the accuracy in identifying the execution configuration of the plurality of jobs by:
delaying the scheduled execution of the one or more other jobs by an amount of time required for the estimation subject job to be executed completely; and
calculating the islanding execution time after the one or more other jobs are delayed.

4. A job scheduling apparatus comprising:
a memory;
a communication interface communicatively coupled to a plurality of execution computers and a plurality of backend computers, wherein the plurality of backend computers includes a first execution computer; and
a processor communicatively coupled to the memory and the communication interface, wherein the processor improves accuracy in identifying an execution configuration of a plurality of jobs that are scheduled to be executed by the plurality of execution computers by:
delaying a first scheduled execution period of an estimation subject job among the plurality of jobs that are scheduled to be executed by the plurality of execution computers by a predetermined amount of delayed time to generate a second scheduled execution period;
generating a first load change pattern indicating a load change at a particular backend computer that is accessed when the estimation subject job is executed by the first execution computer in the first scheduled execution period;
generating a second load change pattern indicating a different load change at the particular backend computer in the second scheduled execution period;
determining an evaluation value indicating a degree of accuracy of the particular backend computer based on the first load change pattern and the second load change pattern; and
scheduling execution of the plurality of jobs on the plurality of execution computers based on the evaluation value and the degree of accuracy value.

5. The job scheduling apparatus according to claim 4,
wherein the predetermined amount of delayed time is at least an amount of time required for the estimation subject job to be executed completely by the first computer.

6. A job scheduling method the method comprising:
steps of using a processor to improve accuracy in identifying an execution configuration of a plurality of jobs that are scheduled to be executed by the plurality of execution computers by:
identifying an estimation subject job from a plurality of jobs that are scheduled to be executed by the first execution computer, wherein the estimation subject job has a scheduled execution period overlapping with a scheduled execution period of one or more other jobs from the plurality of jobs that are scheduled to be executed by the first execution computer and the estimation subject job includes processing that is performed on a particular backend computer from a plurality of backend computers;
calculating an islanding execution time, wherein the island execution time is a time when the estimation subject job is executing individually on the first execution computer, and the one or more other jobs are not being executed;
acquiring a log from the particular backend computer, wherein the log includes information recorded by the particular backend computer when the estimation subject job was processed by the particular backend computer;
calculating an evaluation value based on the islanding execution time;
determining a degree of accuracy value by comparing the islanding execution time with the information recorded by the particular backend computer when the estimation subject job was processed by the particular backend computer; and
scheduling execution of the plurality of jobs on the plurality of execution computers based on the evaluation value and the degree of accuracy value.

* * * * *